(12) United States Patent
Gopalakrishnan et al.

(10) Patent No.: US 11,327,901 B2
(45) Date of Patent: May 10, 2022

(54) MODULAR DYNAMICALLY ALLOCATED CAPACITY STORAGE SYSTEMS IMPLEMENTED AS RESPECTIVE BATTERIES EACH HAVING MULTIPLE SOURCE TERMINALS

(71) Applicant: GM Global Technology Operations LLC, Detroit, MI (US)

(72) Inventors: Suresh Gopalakrishnan, Troy, MI (US); Chandra S. Namuduri, Troy, MI (US); Lyall K. Winger, Waterloo (CA); Dave G. Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 230 days.

(21) Appl. No.: 16/290,495

(22) Filed: Mar. 1, 2019

(65) Prior Publication Data
US 2020/0278936 A1 Sep. 3, 2020

(51) Int. Cl.
*G06F 12/121* (2016.01)
*G06F 1/26* (2006.01)

(52) U.S. Cl.
CPC .............. *G06F 12/121* (2013.01); *G06F 1/26* (2013.01)

(58) Field of Classification Search
CPC ...... H02J 7/0013; H02J 7/0014; H02J 7/0019; H02J 7/0024; G06F 12/121; G06F 1/26; B60K 6/28
USPC ....................................................... 320/117
See application file for complete search history.

(56) References Cited

U.S. PATENT DOCUMENTS

| | | | |
|---|---|---|---|
| 6,909,201 B2 | 6/2005 | Murty et al. | |
| 9,184,582 B2 | 11/2015 | Koch et al. | |
| 9,440,600 B2 | 9/2016 | Koch et al. | |
| 2005/0029867 A1* | 2/2005 | Wood | H02J 1/08 307/10.1 |
| 2012/0232731 A1* | 9/2012 | Sujan | B60W 10/08 701/22 |
| 2013/0278216 A1* | 10/2013 | Son | H02J 7/0024 320/112 |

(Continued)

OTHER PUBLICATIONS

U.S. Appl. No. 16/013,254, filed Jun. 20, 2018, Rich et al.

(Continued)

*Primary Examiner* — Richard Isla
*Assistant Examiner* — Mohammed J Sharief

(57) ABSTRACT

A modular dynamically allocated capacity storage system (MODACS) is provided and includes a housing and a control module. The housing includes source terminals, switches, cells, and sensing module. The source terminals supplying power at a first voltage potential to a first plurality of loads and power at a second voltage potential to a second plurality of loads. The cells are configured to supply power to each of the source terminals based on states of the switches. The sensing modules are configured to determine parameters of each of the cells and generate corresponding status signals. The control module is configured to receive a power request signal, and based on the power request signal and the parameters of each of the cells, determine a connected configuration for the cells relative to each other and the plurality of source terminals and set states of the switches according to the connected configuration.

21 Claims, 19 Drawing Sheets

(56) References Cited

U.S. PATENT DOCUMENTS

| | | | |
|---|---|---|---|
| 2015/0372515 A1* | 12/2015 | Bulur | H02J 7/0021 |
| | | | 320/112 |
| 2017/0057650 A1* | 3/2017 | Walter-Robinson | B64D 41/00 |
| 2017/0126036 A1* | 5/2017 | Dulle | B60L 58/24 |
| 2017/0166075 A1* | 6/2017 | Hong | B60L 50/66 |
| 2017/0187202 A1* | 6/2017 | Shin | H02J 7/0013 |
| 2018/0009400 A1* | 1/2018 | Lee | B60R 16/03 |
| 2018/0219390 A1* | 8/2018 | Tkachenko | H01M 10/425 |
| 2018/0319287 A1* | 11/2018 | Forssell | H01M 10/6551 |
| 2018/0352656 A1 | 12/2018 | Dawley et al. | |
| 2019/0043276 A1 | 2/2019 | Conell et al. | |
| 2019/0196427 A1* | 6/2019 | Kaucic | G05B 19/042 |
| 2019/0270391 A1* | 9/2019 | Kahnt | B60L 58/20 |
| 2021/0020998 A1* | 1/2021 | Musafia | H01M 10/0525 |

OTHER PUBLICATIONS

U.S. Appl. No. 16/034,782, filed Jul. 13, 2018, Conell et al.
U.S. Appl. No. 16/053,073, filed Aug. 2, 2018, Conell et al.
U.S. Appl. No. 16/183,803, filed Nov. 8, 2018, Winger et al.
U.S. Appl. No. 16/183,895, filed Nov. 8, 2018, Rich et al.
U.S. Appl. No. 16/290,457, filed Mar. 1, 2019, Winger et al.
U.S. Appl. No. 16/290,570, filed Mar. 1, 2019, Rich et al.
U.S. Appl. No. 16/290,602, filed Mar. 1, 2019, Winger et al.
U.S. Appl. No. 16/434,671, filed Jun. 7, 2019, Dawley et al.
U.S. Appl. No. 62/857,510, filed Jun. 5, 2019, Winger et al.

* cited by examiner

MODULAR DYNAMICALLY ALLOCATED CAPACITY STORAGE SYSTEMS IMPLEMENTED AS RESPECTIVE BATTERIES EACH HAVING MULTIPLE SOURCE TERMINALS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to battery systems of vehicles.

Traditional vehicles include an internal combustion engine that generates propulsion torque. Hybrid vehicles can include both an internal combustion engine and one or more electric motors for propulsion. The one or more electric motors are used to improve fuel efficiency. The electric motor and the internal combustion engine can be used in combination to achieve greater torque output than using only the internal combustion.

Example types of hybrid vehicles are parallel hybrid vehicles and series hybrid vehicles. In a parallel hybrid vehicle, an electric motor can work in parallel with an engine to combine power and range advantages of the engine with efficiency and regenerative braking advantages of the electric motor. In a series hybrid vehicle, an engine drives a generator to produce electricity for an electric motor, which drives a transmission. This allows the electric motor to assume some of the power responsibilities of the engine, which in turn allows for use of a smaller more fuel efficient engine.

SUMMARY

A modular dynamically allocated capacity storage system (MODACS) is provided and includes a housing and a first control module. The housing includes source terminals, switches, cells, and sensing module. The source terminals supplying power at a first voltage potential to first loads and power at a second voltage potential to second loads. The cells are configured to supply power to each of the source terminals based on states of the switches. The sensing modules are configured to determine parameters of each of the cells and generate corresponding status signals. The first control module is configured to receive a power request signal, and based on the power request signal and the parameters of each of the cells, (i) determine a connected configuration for the cells relative to each other and the source terminals, and (ii) set states of the switches according to the connected configuration.

In other features, the first control module is configured to connect the cells in packs, where each of the packs includes one or more of the cells. At least one of the first control module or the sensing modules is configured to determine pack specific parameters corresponding to each of the packs. The first control module is configured to determine the connected configuration based on the pack specific parameters of each of the packs.

In other features, the first control module is configured to connect the cells in packs and connect the packs in groups, where: each of the packs includes one or more of the cells; and each of the groups includes one or more of the packs. At least one of the first control module or the sensing modules is configured to determine group specific parameters of each of the groups. The first control module is configured to determine the connected configuration based on the group specific parameters of each of the groups.

In other features, the first control module is configured to connect the cells in packs, connect the packs in groups, and connect the groups to form an overall circuit. Each of the packs includes one or more of the cells. Each of the groups includes one or more of the packs. At least one of the first control module or the sensing modules is configured to determine parameters specific to the overall circuit. The first control module is configured to determine the connected configuration based on the parameters specific to the overall circuit.

In other features, the first control module is configured to: determine voltages, temperatures, current levels and state of charges of each of the cells; and based on the voltages, temperatures, current levels and states of charge, determine the connected configuration.

In other features, the first control module is configured to: connect the cells in packs, where each of the packs includes one or more of the cells; determine voltages, temperatures, current levels and states of charge, which are pack specific parameters of each of the packs; and determine the connected configuration based on the pack specific parameters.

In other features, the first control module is configured to connect the cells in packs and connect the packs in groups, where: each of the packs includes one or more of the cells; and each of the groups includes one or more of the packs. The first control module is configured to: determine voltages, temperatures, current levels and states of charge, which are group specific parameters of each of the groups; and determine the connected configuration based on the group specific parameters.

In other features, the first control module is configured to: determine at least one of states of charge, states of health, or states of function for each of the cells, each of multiple packs, each of multiple groups and an overall circuit of the groups. Each of the packs includes one or more of the cells. Each of the groups includes one or more of the packs. The overall circuit includes the groups. The first control module is configured to determine the connected configuration based on the at least one of the states of charge, the states of health, or the states of function.

In other features, the first control module is configured to determine the connected configuration to maximize power levels and current levels at each of the source terminals while satisfying demands for each of the source terminals and while not exceeding at least one of predetermined voltages, predetermined thermal limits, predetermined state of charge limits, predetermined state of health limits, or predetermined state of function limits.

In other features, the first control module is configured to determine voltages, temperatures and current levels of the cells, packs, groups and an overall circuit. Each of the packs includes one or more of the cells. Each of the groups includes one or more of the packs. The overall circuit includes the groups. The first control module is configured to: determine instantaneous power and current limits, short-term power and current limits, and extended period power and current limits for at least one of the cells, the packs, the groups or the overall circuit; and determine the connected configuration based on the instantaneous power and current limits, short-term power and current limits, and extended period power and current limits.

In other features, the instantaneous power and current limits, the short-term power and current limits, and the extended period power and current limits include charge limits or discharge limits.

In other features, the first control module is configured to: operate in multiple modes including a regenerative mode, a boost mode, and an auto-start mode; select one of the modes based on the power request signal and the parameters; and determine the connected configuration based on the selected one of the modes, the power request signal, and the parameters.

In other features, the connected configuration is different for each of the modes.

In other features, the first control module is configured to selectively serially connect the cells to form multiple series of cell blocks. Each of the cell blocks includes one or more cells. Each of the series of cell blocks includes two or more cell blocks.

In other features, the first control module is configured to connect the series of cell blocks in parallel.

In other features, the first control module is attached to or implemented in the housing and is in communication with a vehicle control module. The vehicle control module is external to and remotely located from the MODACS.

In other features, the first control module is configured to connect each of the cells in one or more of multiple groups; and connect the groups in parallel to supply power to one of the source terminals.

In other features, the source terminals include a first source terminal and a second source terminal. The first control module is configured to connect first ones of the cells to supply power to the first source terminal, and connect second ones of the cells to supply power to the second source terminal.

In other features, the first control module is configured to connect some of the first ones of the cells to supply power to both the first source terminal and the second source terminal.

In other features, the source terminals include a third source terminal; and the first control module is configured to select third ones of the cells to supply power to the third source terminal.

In other features, the first control module is configured to connect some of the first ones of the cells to supply power to both the first source terminal and the second source terminal, and connect others of the first ones of the cells to supply power to the first source terminal, the second source terminal, and the third source terminal.

In other features, the first control module is configured to: determine voltages, temperatures, and current levels of sets of cells, wherein each of the sets includes one or more cells; determine instantaneous power and current limits, short-term power and current limits, and continuous power and current limits of each of the sets of cells; and selectively connect the each of the sets of cells to one or more of the source terminals based on the voltages, temperatures, current levels, instantaneous power and current limits, short-term power and current limits, and continuous power and current limits.

In other features, the first control module is configured to: connect the cells in groups; determine a state of charge of each of the groups; determine differences between the states of charge of the groups; and based on the differences, connect selected ones of the groups in parallel.

In other features, the first control module is configured to, if one of the differences is greater than a predetermined range, avoid connecting the corresponding two groups in parallel.

In other features, the first control module is configured to: connect the cells in groups; determine a state of charge of each of the groups; and for a discharge current demand, based on the states of charge of the groups, determine a number of the groups to connect in parallel, and select ones of the groups with highest states of charge to connect in parallel to form a parallel circuit while not connecting the other ones of the groups to the parallel circuit.

In other features, the first control module is configured to: connect the cells in groups; determine a state of charge of each of the groups; and for a charge current demand, based on the states of charge of the groups, determine a number of the groups to connect in parallel, and select ones of the groups with lowest states of charge to connect in parallel to form a parallel circuit while not connecting the other ones of the groups to the parallel circuit.

In other features, the first control module is configured to: periodically update power and current limits of at least one of the cells, packs of the cells in the cells, groups of the packs, or an overall circuit of the groups; and based on the updated power and current limits, reconfigure the cells in to groups to satisfy charge and discharge demands for each of the source terminals.

In other features, the first control module is configured to: determine priority levels of the source terminals; connect the cells in groups based on the priority levels; determine states of charge of the groups; based on the states of charge, determine a number of the groups to connect in parallel to satisfy high priority safety loads; and connect the number of the groups with highest states of charge in parallel to satisfy the high priority safety loads.

In other features, the first control module is configured to: determine if 12V load demand is less than a predetermined amount; and if the 12V load demand is less than the predetermined amount, connect the cells in groups and connect the groups in parallel to maximize power to one of the source terminals. The one of the source terminals is a 48V source terminal.

In other features, a last block of the cells in each row or column of the cells in parallel to satisfy the 12V load demand.

In other features, the first control module is configured to: determine priority levels of the source terminals; connect the cells in groups based on the priority levels; determine states of charge of the groups; based on the states of charge, determine a number of the groups to connect in parallel to satisfy 48V loads; and connect the number of the groups with lowest states of charge in parallel to satisfy the 48V loads.

In other features, the first control module is configured to monitor states of the cells and control states of the switches to prevent at least one of states of charge, voltages or temperatures of the cells from going outside of one or more predetermined ranges.

In other features, a MODACS is provided and includes a housing and a control module. The housing includes: source terminals supplying power at a first voltage potential to first loads via a first source terminal and power at a second voltage potential to second loads via a second source terminal; switches; cells configured to supply power to each of the source terminals based on states of the switches; and sensing modules configured to determine one or more parameters corresponding to each of the cells. The control module is configured to receive a charge request signal, and based on the charge request signal and the one or more parameters, (i) determine a number of groups of cells to connect in parallel to receive regenerative power, (ii) satisfy regenerative load requirements for the second source terminal before satisfying regenerative load requirements for the first source terminal, and (iii) utilize one or more groups of the cells with lowest states of charge for the first source terminal and charge other groups of the cells. The other groups include the number of groups of cells and does not include the one or more groups.

In other features, a MODACS is provided and includes a housing and a control module. The housing includes: source terminals supplying power at a first voltage potential to first loads via a first source terminal and power at a second voltage potential to second loads via a second source terminal; switches; cells configured to supply power to each of the source terminals based on states of the switches; and sensing modules configured to determine one or more parameters corresponding to each of the cells. The control module is configured to receive a discharge request signal, and based on the discharge request signal and the one or more parameters, (i) determine a number of groups of cells to connect in parallel to discharge power, (ii) satisfy load requirements for the second source terminal before satisfying load requirements for the first source terminal, and (iii) utilize one or more groups of the cells with highest states of charge for the first source terminal and discharge other groups of the cells. The other groups include the number of groups of cells and does not include the one or more groups.

In other features, a MODACS is provided and includes a housing and a control module. The housing includes source terminals, switches, cells and sensing modules. The source terminals supply power at a first voltage potential to first loads via a first source terminal and power at a second voltage potential to second loads via a second source terminal. The cells are configured to supply power to each of the source terminals based on states of the switches. The sensing modules are configured to determine one or more parameters corresponding to each of the cells. The control module is configured to (i) determine whether a predetermined type of starter is used to start an engine, and (ii) based on the one or more parameters and whether the predetermined type of starter is used, (a) connect packs of the cells in parallel to maximize current capability for the second source terminal, or (b) connect multiple series of blocks of the cells in parallel to provide a maximum starting current for the first source terminal.

The control module is configured to: determine states of charge, voltages, and temperature limits of each of the cells; determine which one or more of the multiple series of blocks or the packs to be connected in parallel to provide commanded power and current for an autostart; determine a connected configuration of the switches to provide the commanded power and current based on the one or more of the multiple series of blocks or the packs to be connected in parallel to provide commanded power and current; and set states of the switches to be in the connected configuration to provide the commanded power and current.

In other features, a MODACS is provided and includes a housing and a control module. The housing includes source terminals supplying power at a first voltage potential to first loads via a first source terminal and power at a second voltage potential to second loads via a second source terminal. The cells are configured to supply power to each of the source terminals based on states of the switches. The sensing modules are configured to determine one or more parameters corresponding to each of the cells. The control module is configured to execute an algorithm to control capacity allocation for the source terminals based on the parameters and at least one of: a vehicle operating state; states of power rails of the source terminals; an amount of load current; a power rail hold-up time; an amount of power supplied to loads; rates of capacity changes for each of the source terminals; priority levels of power domains; or minimum capacity requirements for one or more of the source terminals.

In other features, the control module is configured to control the capacity allocation using a respective voltage regulation window for each of the source terminals.

In other features, the control module is configured to control the capacity allocation for the source terminals based on: the vehicle operating state; the states of power rails of the source terminals; the amount of load current; the power rail hold-up time; the amount of power supplied to loads; the rates of capacity changes for each of the source terminals; the priority levels of power domains; and the minimum capacity requirements for one or more of the source terminals.

In other features, the control module is configured to detect a fault corresponding to one of the source terminals, and turn OFF the one of the source terminals until an under voltage condition and an over voltage condition for the one of the source terminals does not exist.

In other features, the control module is configured to detect a fault corresponding to a generator, set load priorities to generator fault settings, and set minimum block allocations for one of the source terminals to second generator fault settings.

In other features, a MODACS is provided and includes a housing and a control module. The housing includes source terminals, cells, and sets of switches. The source terminals include a first source terminal, a second source terminal and a third source terminal. A preset voltage of the first source terminal is different than preset voltages of the second source terminal and the third source terminal. Each of the sets of switches includes at least four switches and connects one of the cells to the first source terminal, the second source terminal and the third source terminal. The control module is configured to: determine a connected configuration of the cells relative to the source terminals including determining which ones of the cells to connect to each of the first source terminal, the second source terminal and the third source terminal; and control states of the sets of switches according to the connected configuration.

In other features, each of the sets of switches includes only four switches.

In other features, the housing includes sensing modules configured to determine parameters of the cells. The control module is configured to, based on the parameters, determine the connected configuration.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
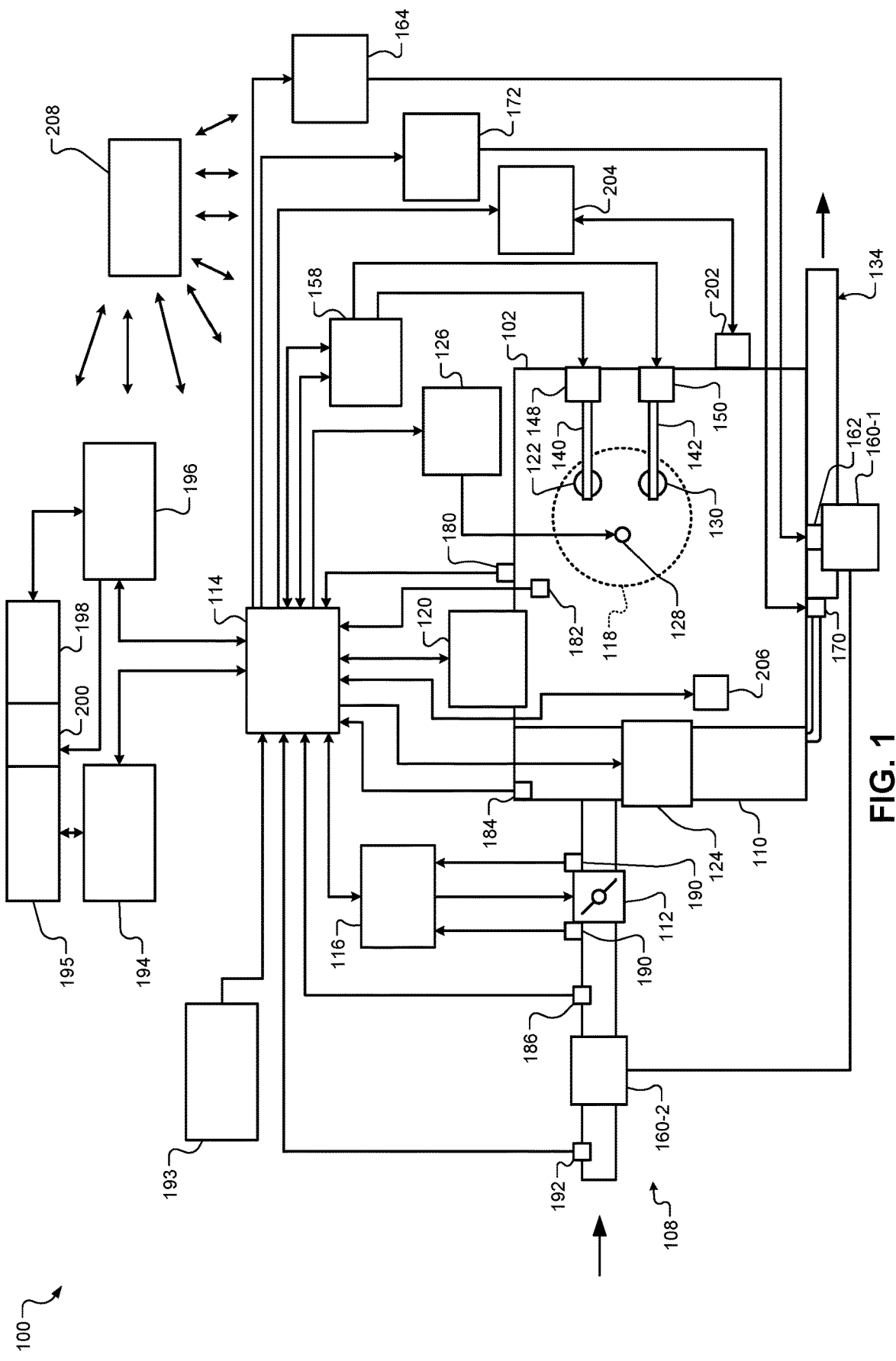
FIG. 1 is a functional block diagram of an example vehicle control system including a modular dynamically allocated capacity storage system (MODACS) in accordance with an embodiment of the present disclosure.

Multiple MODACSs and corresponding operating methods are disclosed herein. A MODACS may be implemented as a single battery having a corresponding housing with a negative (or ground reference) terminal and multiple source terminals. Each of the source terminals of a MODACS may have a preset direct current (DC) voltage (e.g., 12 volts (V) or 48V) and may supply (or discharge) current or receive current during charging. As an example, the MODACS may include a single 48V source terminal, a first 12V source terminal and a second 12V source terminal.

A MODACS includes multiple battery cells (hereinafter referred to as cells) and a MODACS control module. The MODACS control module may be attached to, implemented in or be connected externally to the housing of the MODACS. The MODACS control module may be implemented partially or fully at the housing or at a remote location. As an example, the MODACS control module may be implemented as a control module within a vehicle and/or as part of a vehicle control module.

The housing may include switches and battery monitoring (or management) modules (BMSs). The switches and BMSs may be connected to and/or implemented separate from the cells. The MODACS control module controls operating states of the switches to connect selected ones of the cells to the source terminals based on information from the BMSs. Any number of the cells may be selected and connected to each of the source terminals. The same or different cells may be connected to each of the source terminals at any moment in time. As further described below, the cells may be connected: in series and/or in parallel; in different connected configurations; and may be organized into blocks, packs, and/or groups. Each block may include one or more cells, which may be connected in series and/or in parallel. Each pack may include one or more blocks, which may be connected in series and/or in parallel. Each group may include one or more packs, which may be connected in series and/or in parallel. The groups may be connected in series and/or in parallel. Each of the BMSs may be assigned to one or more cells, one or more blocks, one or more packs, and/or one or more groups and monitor corresponding parameters, such as voltages, temperatures, current levels, SOXs, instantaneous power and/or current limits, short-term power and/or current limits, and/or continuous power and/or current limits.

The acronym "SOX" refers to a state of charge (SOC), a state of health (SOH), and/or a state of function (SOF). The SOC of a cell may refer to the voltage, current and/or amount of available power stored in the cell. The SOH of a cell may refer to: the age (or operating hours); whether there is a short circuit; temperatures, voltages, and/or current levels supplied to or sourced from the cell during certain operating conditions; and/or other parameters describing the health of the cell. The SOF of a cell may refer to a current temperature, voltage, and/or current level supplied to or sourced from the cell, and/or other parameters describing a current functional state of the cell.

Instantaneous power and current limits may refer to power and current limits for a short period of time (e.g., less than 2 seconds). Short term power and current limits may refer to power and current limits for an intermediate length of time (e.g., 2-3 seconds). Continuous power and current limits refer to power and current limits for an extended period of time (e.g., periods greater than 3 seconds).

A MODACS control module controls the states of the switches to connect the cells to the source terminals while satisfying target and/or requested voltages, currents and power capacities. The MODACS control module and/or a vehicle control module may set the target and/or requested voltages, currents and power capacities, for example, based on a mode of operation. A MODACS may operate in different operating modes, which correspond to vehicle operating modes, as described below. The MODACS operating modes may include, for example, a regenerative mode, a boost mode, an autostart mode, or other MODACS charge or discharge modes. The vehicle operating modes may include an electric vehicle launch mode, an engine start mode, an engine assist mode, an opportunity charging mode, a deceleration fuel cut-off (DFCO) regenerative mode, an electric vehicle regenerative mode (e.g., a generator DFCO regenerative mode or a brake regenerative mode), an electric vehicle cruise mode, and/or other vehicle operating mode. Each of the vehicle operating modes corresponds to one of the MODACS modes. The stated modes are further described below.

The implementations disclosed herein may be applied to fully electric vehicles, battery electric vehicles (BEVs), hybrid electric vehicles including pug-in hybrid electric vehicles (PHEVs), partially or fully autonomous vehicles, and other types of vehicles.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous, partially autonomous or fully autonomous.

Air is drawn into the engine 102 through an intake system 108. The intake system 108 may include an intake manifold 110 and a throttle valve 112. For example only, the throttle valve 112 may include a butterfly valve having a rotatable blade. An engine (or vehicle) control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 may include any number of cylinders, for illustration purposes a single representative cylinder 118 is shown. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The engine 102 may be a homogenous charge compression ignition (HCCI) engine that performs both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a MODACS 208 to the electric motor 198 to cause the electric motor 198 to output positive torque. The MODACS 208 is further described below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the MODACS 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the MODACS 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
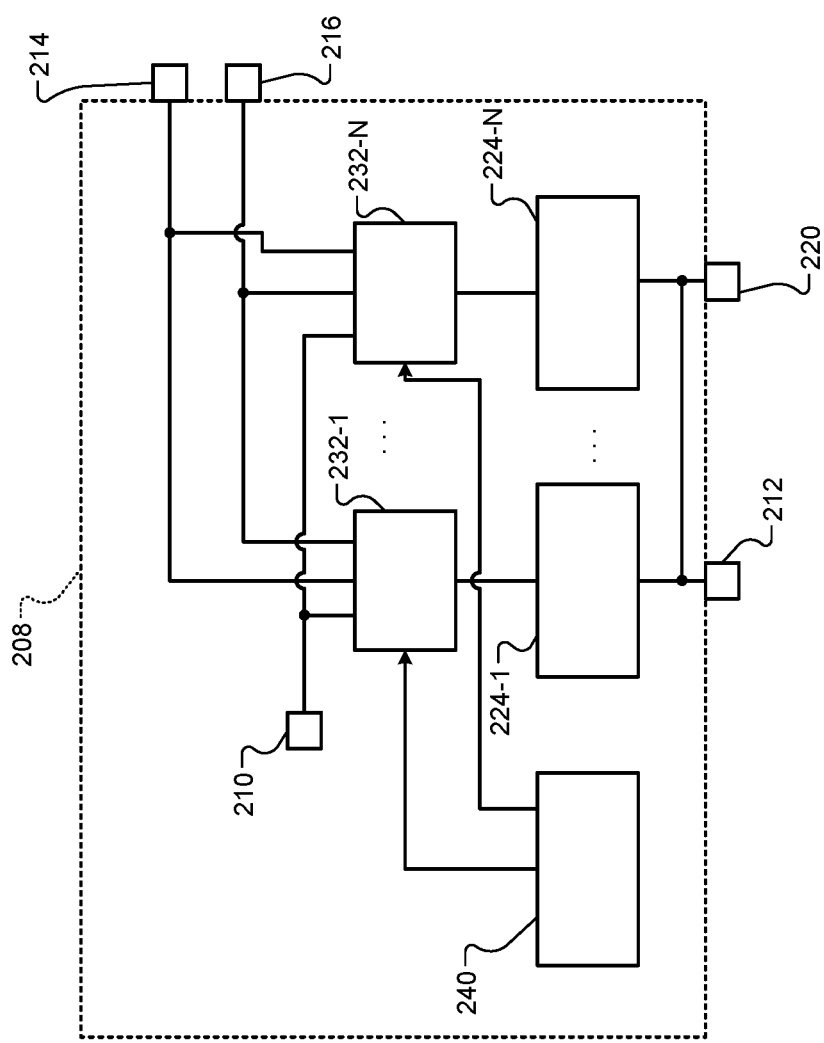
FIG. 2 is a functional block diagram of an example MODACS in accordance with an embodiment of the present disclosure.

FIG. 2 is a functional block diagram of the MODACS 208. The MODACS 208 may be implemented as a single battery having multiple source terminals. Three example source terminals 210, 214, 216 are shown, although any number of source terminals may be included. The source terminals, which may be referred to as positive output terminals, provide respective direct current (DC) operating voltages. The MODACS may include only one negative terminal or may include a negative terminal for each source terminal. For example only, the MODACS 208 may have a first positive (e.g., 48 Volt (V)) terminal 210, a first negative terminal 212, a second positive (e.g., a first 12V) terminal 214, a third positive (e.g., a second 12V) terminal 216, and a second negative terminal 220. While the example of the MODACS 208 having a 48V operating voltage and two 12V operating voltages is provided, the MODACS 208 may have one or more other operating voltages, such as only two 12V operating voltages, only two 48V operating voltages, two 48V operating voltages and a 12V operating voltage, or a combination of two or more other suitable operating voltages.

The MODACS 208 includes cells and/or blocks of cells, such as a first block 224-1 to an N-th block 224-N ("blocks 224"), where N is an integer greater than or equal to 2. Each of the blocks 224 may include one or more cells and may be separately replaceable within the MODACS 208. For example only, each of the blocks 224 may be an individually housed 12V DC battery. The ability to individually replace the blocks 224 may enable the MODACS 208 to include a shorter warranty period and have a lower warranty cost. The blocks 224 are also individually isolatable, for example, in the event of a fault in a block. In various implementations, the MODACS 208 may have the form factor of a standard automotive grade 12V battery.

Each of the blocks 224 has its own separate capacity (e.g., in amp hours, Ah). The MODACS 208 includes switches, such as first switches 232-1 to 232-N (collectively "switches 232"). The switches 232 enable the blocks 224 to be connected in series, parallel, or combinations of series and parallel to provide desired output voltages and capacities at the output terminals.

A MODACS control module 240 controls the switches 232 to provide desired output voltages and capacities at the source terminals. The MODACS control module 240 controls the switches 232 to vary the capacity provided at the source terminals based on a present operating mode of the vehicle, as discussed further below.

Figure 3A:
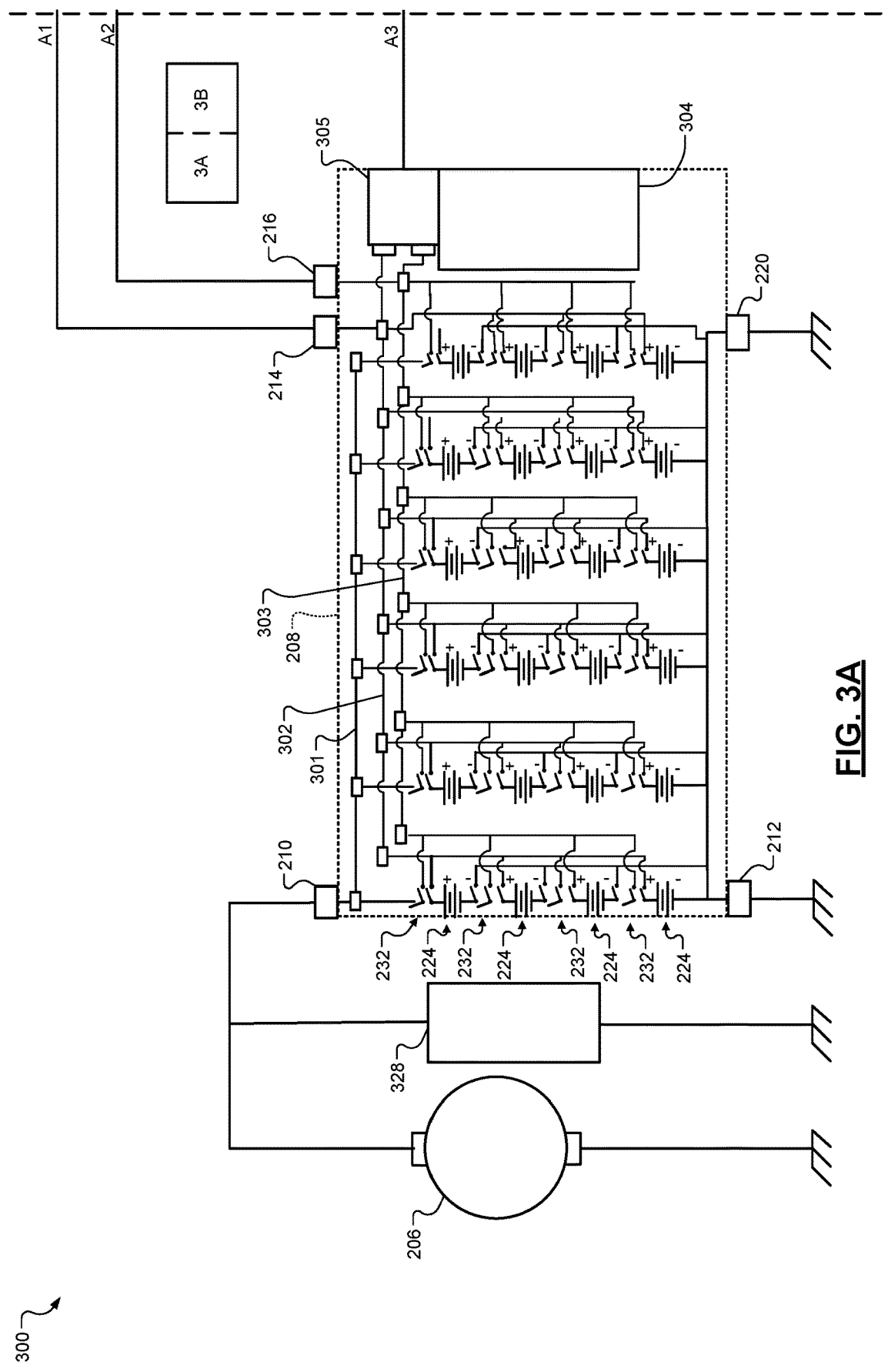
FIGS. 3A-3B are a schematic including an example implementation of a MODACS in accordance with an embodiment of the present disclosure.
Figure 3B:
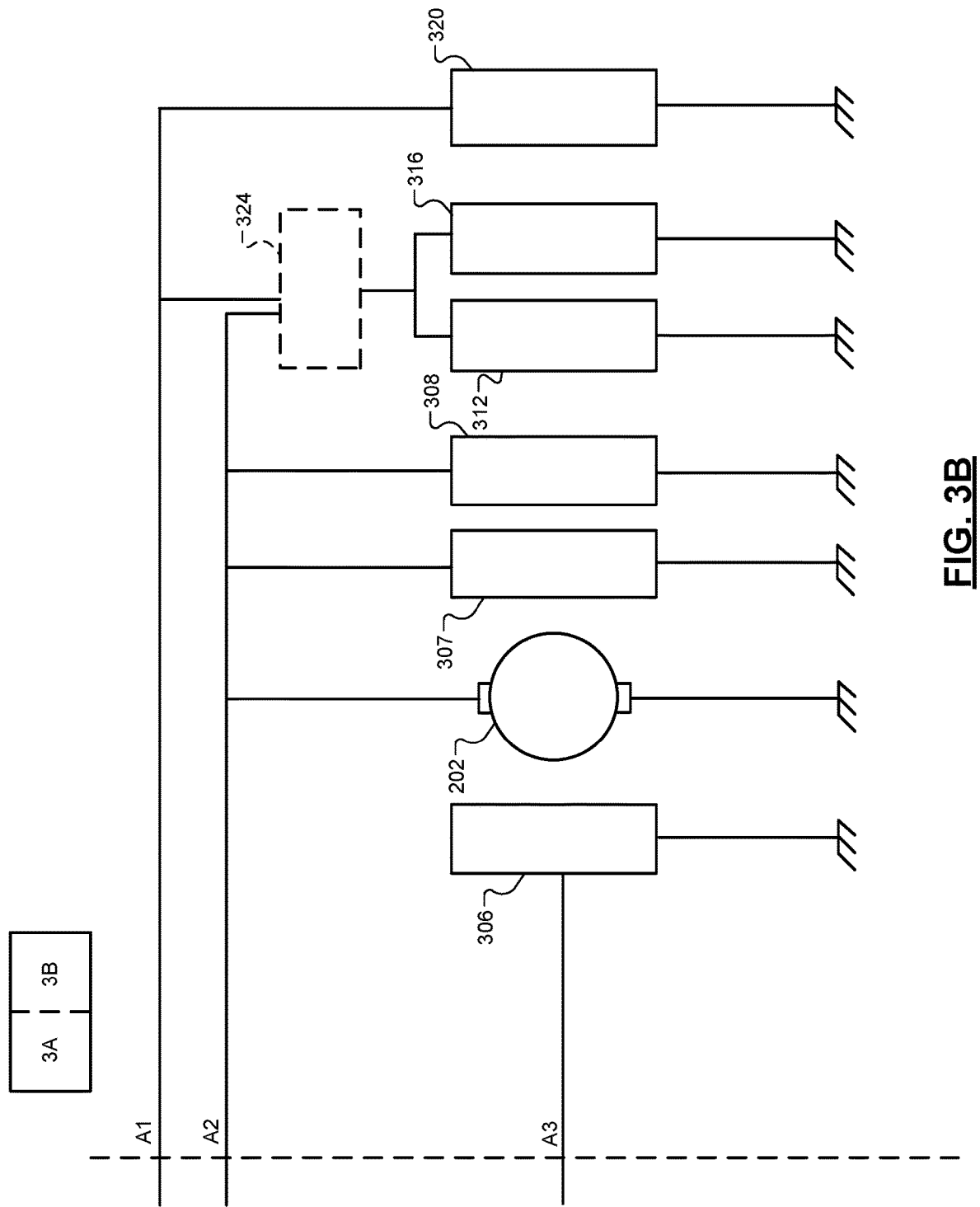

FIGS. 3A-3B show a vehicle electrical system 300 including an example implementation of the MODACS 208. The MODACS 208 includes the source terminals 210, 214, 216, respective power rails 301, 302, 303, a MODACS control module 304, and a power control circuit 305, which may be connected to the MODACS control module 304 and vehicle control module (VCM) and/or BCM 306. The VCM and/or BCM 306 may operate similar as, include and/or be implemented as the ECM 114 of FIG. 1. Power rail 303 may be a redundant power rail and/or used for different loads than the power rail 302. The MODACS control module 304, the power control circuit 305 and the VCM and/or BCM 306 may communicate with each other via a controller area network (CAN), a local interconnect network (LIN), a serial network, wirelessly and/or another suitable network and/or interface. The MODACS control module 304 may communicate with the VCM and/or BCM 306 directly or indirectly via the power control circuit 305 as shown.

In the example of FIG. 3A, sets of 4 of the blocks 224 (e.g., 12V blocks) are connectable in series (via ones of the switches 232) to the first positive terminal 210 and the first negative terminal 212 to provide a first output voltage (e.g., 48V). Individual ones of the blocks 224 may be connected (via ones of the switches 232) to the second positive terminal 214 or the third positive terminal 216 and the second negative terminal 220 to provide a second output voltage (e.g., 12V) at the second and third positive terminals 214 and 216. How many of the blocks 224 are connected to the first positive terminal 210, the second positive terminal 214, and the third positive terminal 216 dictates the portions of the overall capacity of the MODACS 208 available at each of the positive terminals.

As shown in FIG. 3B, a first set of vehicle electrical components operates using one of the two or more operating voltages of the MODACS 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the VCM and/or BCM 306 and other control modules of the vehicle, the starter motor 202, and/or other electrical loads, such as first 12V loads 307, second 12V loads 308, other control modules 312, third 12V loads 316, and fourth 12V loads 320. In various implementations, a switching device 324 may be connected to both of the first and second positive terminals 214. The switching device 324 may connect the other control modules 312 and the third 12V loads 316 to the second positive terminal 214 or the third positive terminal 216.

As shown in FIG. 3A, a second set of vehicle electrical components operates using another one of the two or more operating voltages of the MODACS 208. For example, the second set of vehicle electrical components may be connected to the first positive terminal 210. The second set of vehicle electrical components may include, for example but not limited to, the generator 206 and various electrical loads, such as 48V loads 328. The generator 206 may be controlled to recharge the MODACS 208.

Each of the switches 232 may be an insulated gate bipolar transistor (IGBT), a field effect transistor (FET), such as a metal oxide semiconductor FET (MOSFET), or another suitable type of switch.

Figure 4:
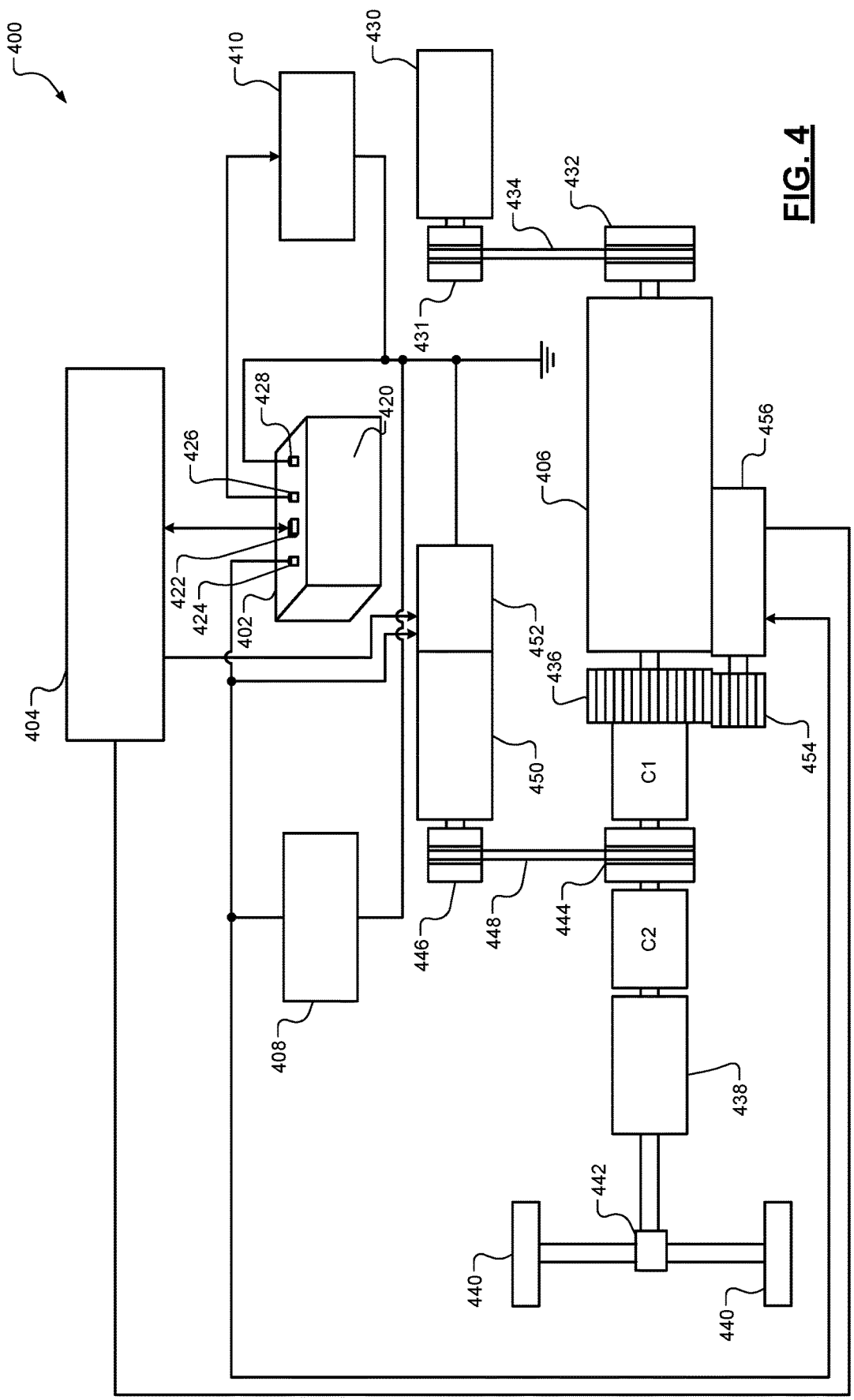
FIG. 4 is a functional block diagram of another example of a vehicle control system in accordance with an embodiment of the present disclosure.

FIG. 4 shows an example of another vehicle control system 400 that is applicable to the MODACSs disclosed herein. The vehicle control system 400 includes a MODACS 402, a vehicle control module 404, an internal combustion engine (ICE) 406, high-voltage loads 408, and low-voltage loads 410. The high-voltage loads 408 may include electric motors, compressors, and/or other high-voltage loads. The low-voltage loads may include lights, seat heaters, electric fans, audio system, video system, power window motors, power door lock motors, electronic circuits, etc. The MODACS 402 has a housing 420 and includes a MODACS control module 422, a first source terminal 424, a second source terminal 426 and a negative (or reference ground) terminal 428. The MODACS 402 may have any number of source terminals.

The ICE 406 may drive a water pump 430 via pulleys 431, 432 and belt 434. The ICE 406 may drive a main gear 436, which drives a clutches C1, C2 and a Transmission 438 to drive wheels 440 via a differential 442. The first clutch C1 may be used to engage pulleys 444, 446 and belt 448, which drive a motor generator unit (MGU) 450. The second clutch C2 may be used to engage the transmission 438. An AC-to-DC converter 452 converts alternating current (AC) power from the MGU 450 to DC power, which is used to charge the cells of the MODACS 402. The main gear 436 may be turned by a second gear 454 via a starter 456 when cranking the ICE 406.

Figure 5:
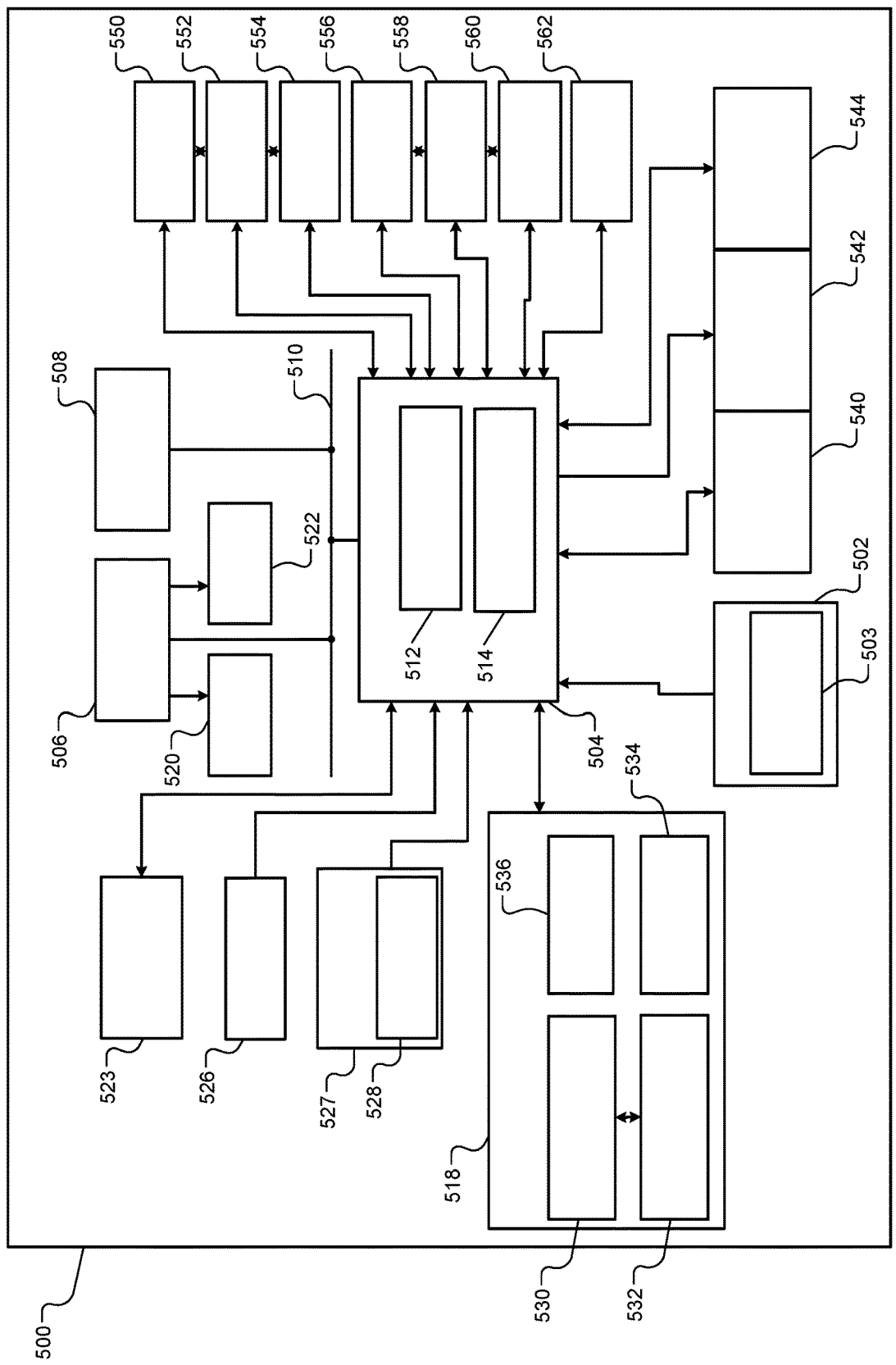
FIG. 5 is a functional block diagram of a vehicle including a MODACS in accordance with an embodiment of the present disclosure.

FIG. 5 shows a vehicle 500 illustrating another example implementation of a MODACS, which may replace and/or operate similarly as the MODACS 208 and 402 of FIGS. 1-4. The vehicle 500 may include a MODACS 502 with a MODACS control module 503, a vehicle control module 504, an infotainment module 506 and other control modules 508. The modules 503, 504, 506, 508 may communicate with each other via a controller area network (CAN) bus 510 and/or other suitable interfaces. The vehicle control module 504 may control operation of vehicles systems. The vehicle control module 504 may include a mode selection module 512, a parameter adjustment module 514, as well as other modules. The mode selection module 512 may select a vehicle operating mode, such as one of the vehicle operating modes stated above. The parameter adjustment module 514 may be used to adjust parameters of the vehicle 500.

The vehicle 500 may further include: a memory 518; a display 520; an audio system 522; one or more transceivers 523 including sensors 526; and a navigation system 527 including a global positioning system (GPS) receiver 528. The sensors 526 may include sensors, cameras, objection detection sensors, temperature sensors, accelerometers, vehicle velocity sensor, and/or other sensors. The GPS receiver 528 may provide vehicle velocity and/or direction (or heading) of the vehicle and/or global clock timing information.

The memory 518 may store sensor data 530 and/or vehicle parameters 532, MODACS parameters 534, and applications 536. The applications 536 may include applications executed by the modules 503, 504, 506, 508. Although the memory 518 and the vehicle control module 504 are shown as separate devices, the memory 518 and the vehicle control module 504 may be implemented as a single device.

The vehicle control module 504 may control operation of an engine 540, a converter/generator 542, a transmission 544, a window/door system 550, a lighting system 552, a seating system 554, a mirror system 556, a brake system 558, electric motors 560 and/or a steering system 562 according to parameters set by the modules 503, 504, 506, 508. The vehicle control module 504 may set some of the parameters based on signals received from the sensors 526. The vehicle control module 504 may receive power from the MODACS 502, which may be provided to the engine 540, the converter/generator 542, the transmission 544, the window/door system 550, the lighting system 552, the seating system 554, the mirror system 556, the brake system 558, the electric motors 560 and/or the steering system 562, etc. Some of the vehicle control operations may include unlocking doors of the window/door system 550, enabling fuel and spark of the engine 540, starting the electric motors 560, powering any of the systems 550, 552, 554, 556, 558, 562, and/or performing other operations as are further described herein.

The engine 540, the converter/generator 542, the transmission 544, the window/door system 550, the lighting system 552, the seating system 554, the mirror system 556, the brake system 558, the electric motors 260 and/or the steering system 562 may include actuators controlled by the vehicle control module 504 to, for example, adjust fuel, spark, air flow, steering wheel angle, throttle position, pedal position, door locks, window position, seat angles, etc. This control may be based on the outputs of the sensors 526, the navigation system 527, the GPS 528 and the above-stated data and information stored in the memory 518.

The vehicle control module 504 may determine various parameters including a vehicle speed, an engine speed, an engine torque, a gear state, an accelerometer position, a brake pedal position, an amount of regenerative (charge) power, an amount of boost (discharge) power, an amount of autostart/stop discharge power, and/or other information, such as priority levels of source terminals of the MODACS 502, power, current and voltage demands for each source terminal, etc. The vehicle control module 504 may share this information and the vehicle operating mode with the MODACS control module 503. The MODACS control module 503 may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The MODACS control module 503 may determine connected configurations of the cells and corresponding switch states as described herein based on the parameters determined by the vehicle control module 504 and/or the MODACS control module 503.

The following FIGS. 6-12 are associated with reconfiguring blocks within a MODACS to maximize regenerative, boost and autostart power capacities while maintaining parameters of cells within predetermined limits (e.g., within thermal limits) to maintain health and proper functioning of the cells and improve life expectancy of the cells. This includes maximizing charge and discharge capability of the MODACS via cell reconfiguring based on vehicle operating conditions and modes of operation. Implementations are provided for maximizing charging and discharging power and current capabilities to provide the appropriate power and current charging and discharging characteristics during the different MODACS operating modes. This includes maximizing power and current outputs during an autostart using a 12V or 48V starter. SOX, voltage, temperature and current limits are monitored and cell configurations are selected for safe operation of the MODACS for each mode. The disclosed MODACSs are able to support the described operating modes while maximizing fuel economy.

Figure 6:
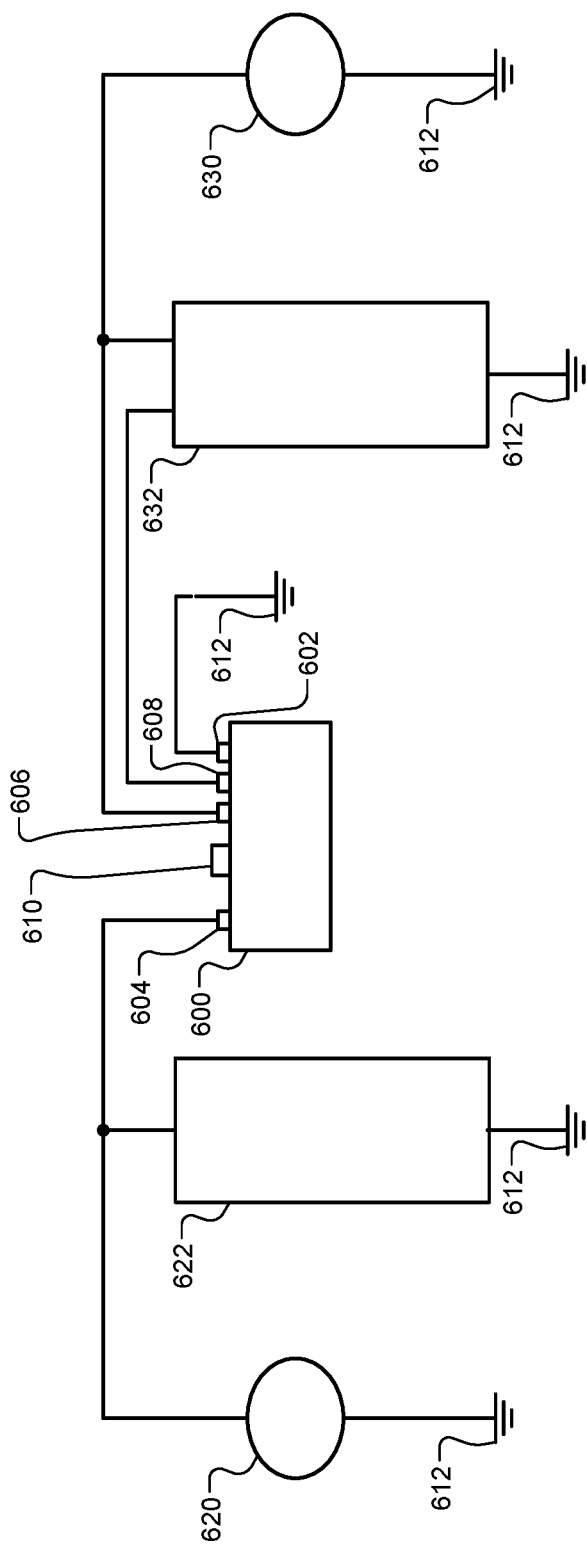
FIG. 6 is a functional block diagram of an example MODACS used with a 12V starter and a starter generator unit in accordance with an embodiment of the present disclosure.

FIG. 6 shows a MODACS 600 that includes a negative (or ground reference) terminal 602, source terminals 604, 606, 608, and a MODACS control module 610. Although three source terminals are shown, the MODACS 600 may include any number of source terminals. The negative terminal 602 is connected to a negative terminal 612. The source terminals 604, 606, 608 supply and/or receive power at respective voltages. In the example shown, the source terminals 604, 606, 608 are 48V, 12V, 12V terminals. In an embodiment, the terminals 606, 608 are referred to as 12VA and 12VB terminals. The source terminal 604 may be connected to a starter generator unit (SGU) 620 and 48V loads 622. The 48V loads may include, for example, motors, compressors, and/or other high-voltage loads. The SGU 620 is shown as an example. In one embodiment, one or more 48V starters, one or more 48V generators and/or a 48V SGU is included. The source terminals 606, 608 may be connected to a 12V starter 630 and 12V loads 632.

Figure 7:
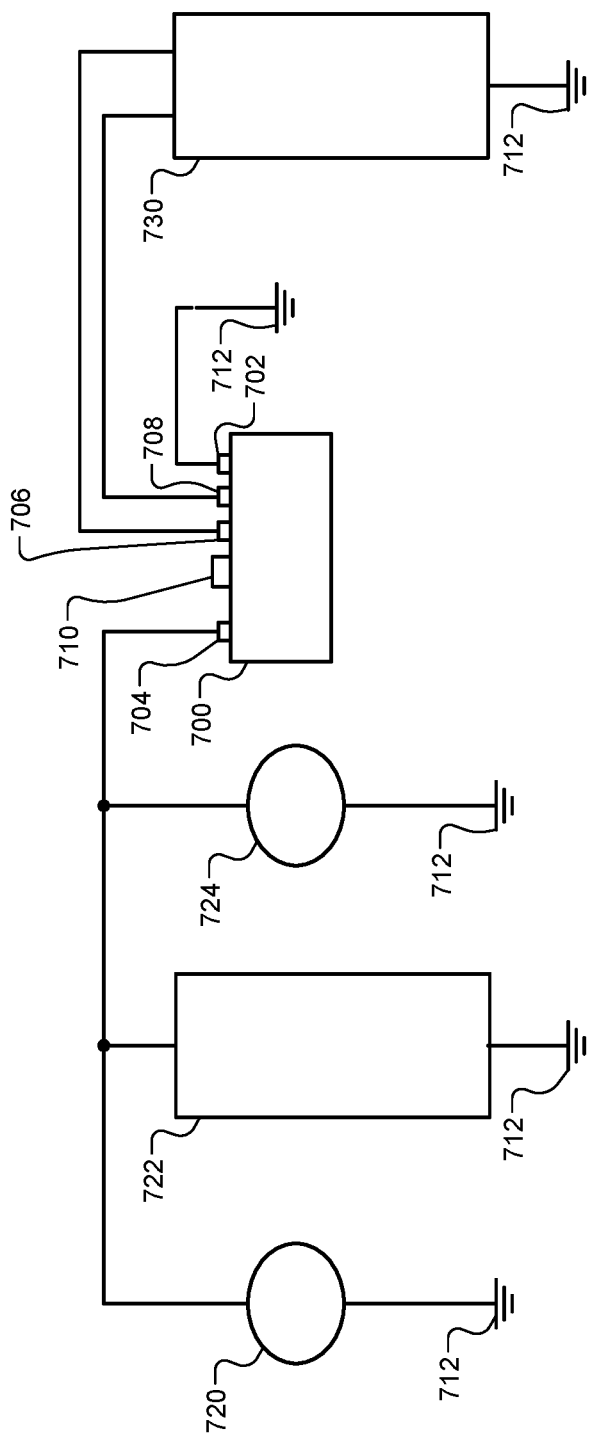
FIG. 7 is a functional block diagram of an example MODACS used with a 48V starter and a starter generator unit in accordance with an embodiment of the present disclosure.

FIG. 7 shows a MODACS 700 that includes a negative (or ground reference) terminal 702, source terminals 704, 706, 708, and a MODACS control module 710. Although three source terminals are shown, the MODACS 700 may include any number of source terminals. The negative terminal 702 may be connected to a ground reference terminal 712. The source terminals 704, 706, 708 supply and/or receive power at respective voltages. In the example shown, the source terminals 704, 706, 708 are 48V, 12V, 12V terminals. The terminals 706, 708 may be referred to as 12VA and 12VB terminals. The source terminal 704 may be connected to a starter generator unit (SGU) 720, 48V loads 722, and a 48V starter 724. The source terminals 706, 708 may be connected to 12V loads 730.

Based on the vehicle operating mode and the MODACS operating mode, the above SGUs, 48V starter and/or 12V starters may be used for hot starts when a temperature of the corresponding engine is above a predetermined temperature. As an example, when operating in an electrical only mode (engine is OFF) and a SGU is providing power to drive a vehicle, a 12V starter or a 48V starter may be used to start the engine. A 48V starter or a 12V starter may be used for a cold start when a temperature of the corresponding engine is below a predetermined temperature.

FIGS. 6-7 are implemented without use of a DC-to-DC converter.

Figure 8:
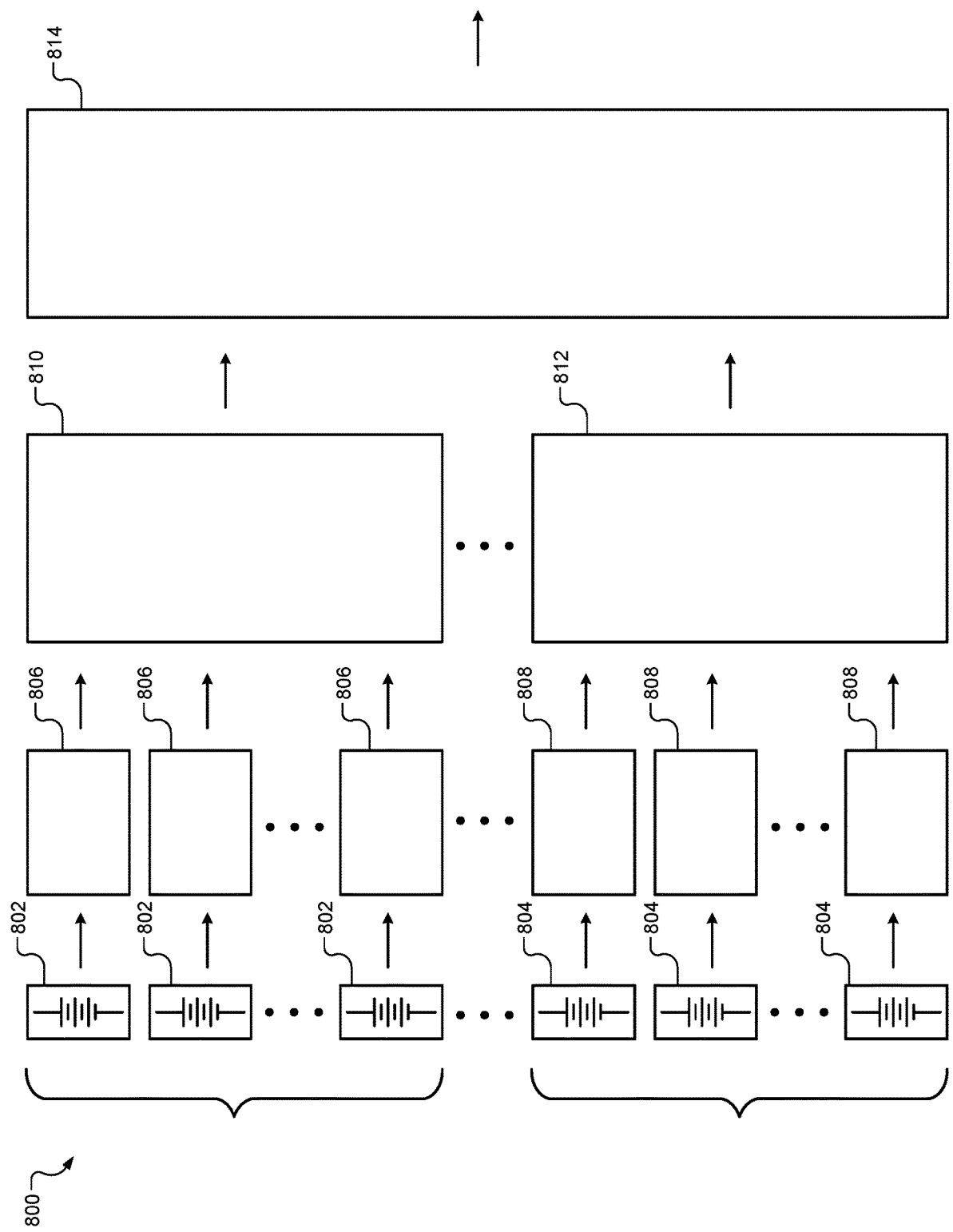
FIG. 8 is a functional block diagram of an example MODACS monitoring circuit in accordance with an embodiment of the present disclosure.

FIG. 8 shows a MODACS monitoring circuit 800 that includes cell blocks or packs 802, 804. Each of the cell blocks or packs 802, 804 may include one or more cells. The cell blocks or packs 802 are in a first group. The cell blocks or packs 804 are in a second group. BMS modules 806 are provided for each cell block or pack 802. BMS modules 808 are provided for each cell block or pack 804. A BMS module 810 is provided to monitor the blocks and/or packs of the first group and is connected to the BMS modules 806. A BMS module 812 is provided to monitor the blocks and/or packs of the last group and is connected to the BMS modules 808. A BMS module 814 is provided to monitor the groups and is connected to the BMS modules 810, 812.

Operations of the BMS modules 806, 808, 810, 812, 814 are described with respect to the following FIGS. 9-12. Each of the BMS modules 806, 808, 810, 812, 814 may output charge and discharge power and current limits for the cells, blocks, packs, groups, and/or MODACS monitoring circuit 800 as a whole. The limits may include instantaneous, short term and continuous power and current limits. The BMS modules operate to maximize power and/or current at the source terminals of the corresponding MODACS while not exceeding predetermined limits (e.g., voltage, temperature, current, and SOX limits).

The number of cells connected in series in a block or pack may depend on cell chemistry. Each block or pack may include any number of cells connected in series. As an example, for a 48V system, four 12V packs may be connected in series. In an embodiment, a MODACS includes 3 series of packs, where each series includes 4 12V packs, which are connected in series. Each of the series of packs may be connected in parallel with one or more of the other series of packs. The total number of groups that are connected in parallel depends on targeted and/or requested power and current capacity of the overall MODACS and the corresponding loads. As errors and/or faults occur in a cell, block, pack, and/or group, other cells, blocks, packs and/or groups may be connected up and used in replacement.

Figure 9:
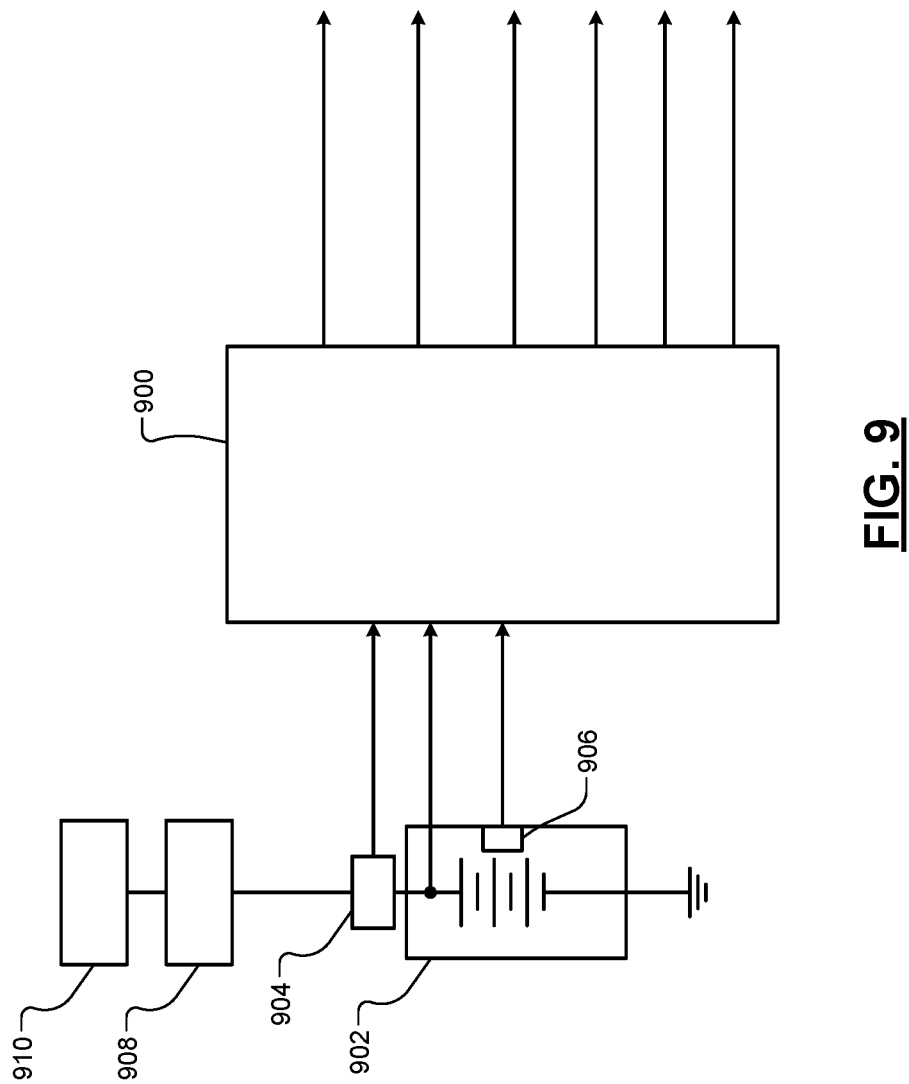
FIG. 9 is a functional block diagram of an example battery monitoring (or management) system (BMS) module for a battery pack in accordance with an embodiment of the present disclosure.

FIG. 9 shows a BMS module 900 for a block or pack 902. In the example shown, the BMS module 900 monitors voltages, temperatures and current levels of the corresponding one or more cells of the block or pack 902 and determines certain parameters. The parameters may include instantaneous charge and discharge power and current limits, short term charge and discharge power and current limits, and continuous charge and discharge power and current limits. The parameters may also include minimum and maximum voltages, minimum and maximum operating temperatures, and SOX limits and/or values. The parameters output by the BMS module 900 may be determined based on the voltages, temperatures and/or current levels monitored. The charge and discharge power and current capability of a 12V block or pack is affected by the minimum and maximum voltages, minimum and maximum operating temperatures, and SOX limits and/or values of the corresponding cells. The BMS module 900 may monitor individual cell voltages, temperatures and current levels and determine based on this information the stated parameters.

As an example, the BMS module 900 may include and/or be connected to sensors, such as a current sensor 904 and a temperature sensor 906, which may be used to detect current levels through the cells of block or pack 902 and temperatures of the block or pack 902. As an example, a voltage across the block or pack may be detected as shown. In an embodiment, one or more voltage sensors may be included to detect voltages of the block or pack 902. The current sensor 904 may be connected, for example, between the block or pack 902 and a source terminal 908, which may be connected to a load 910.

Figure 10:
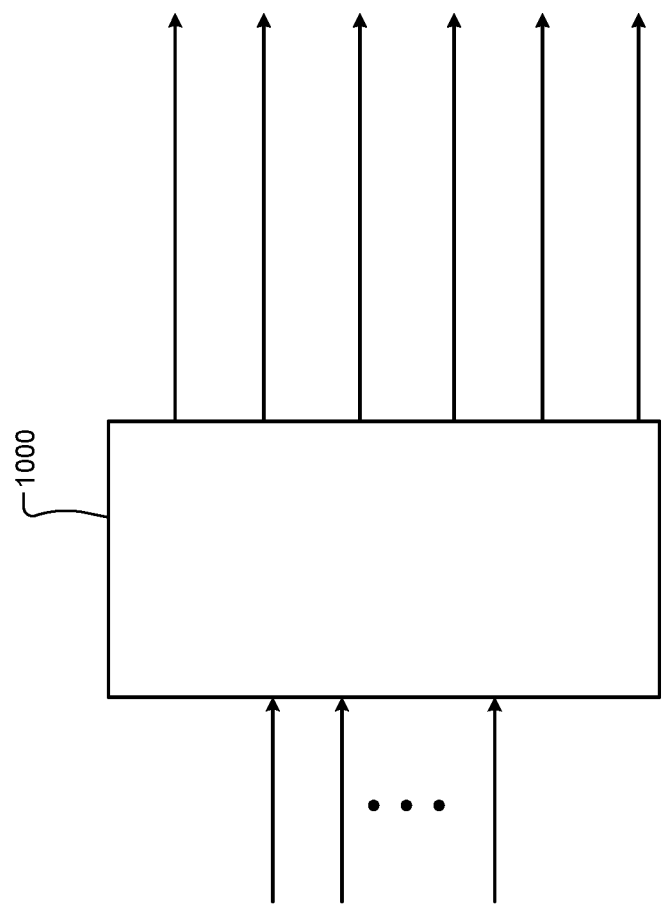
FIG. 10 is a functional block diagram of an example BMS module for a group of battery packs in accordance with an embodiment of the present disclosure.

FIG. 10 shows a BMS module 1000 for a group of blocks and/or packs. The BMS module 1000 may monitor parameters at a 12V level and/or at a 48V level. The BMS module 1000 may receive the outputs of the corresponding BMS modules at the block and/or pack level (e.g., the outputs of the BMS module 900 of FIG. 9) and based on this information generate instantaneous, short term, and continuous power and current limits for a group level. This may include calculating maximum voltages, power levels, and current levels of a connected configuration of the cells of the corresponding group (e.g., of a group of packs connected in series). In a series configuration, where multiple packs are connected in series, a charge or discharge current limit is based on a weakest pack in that series.

Figure 11:
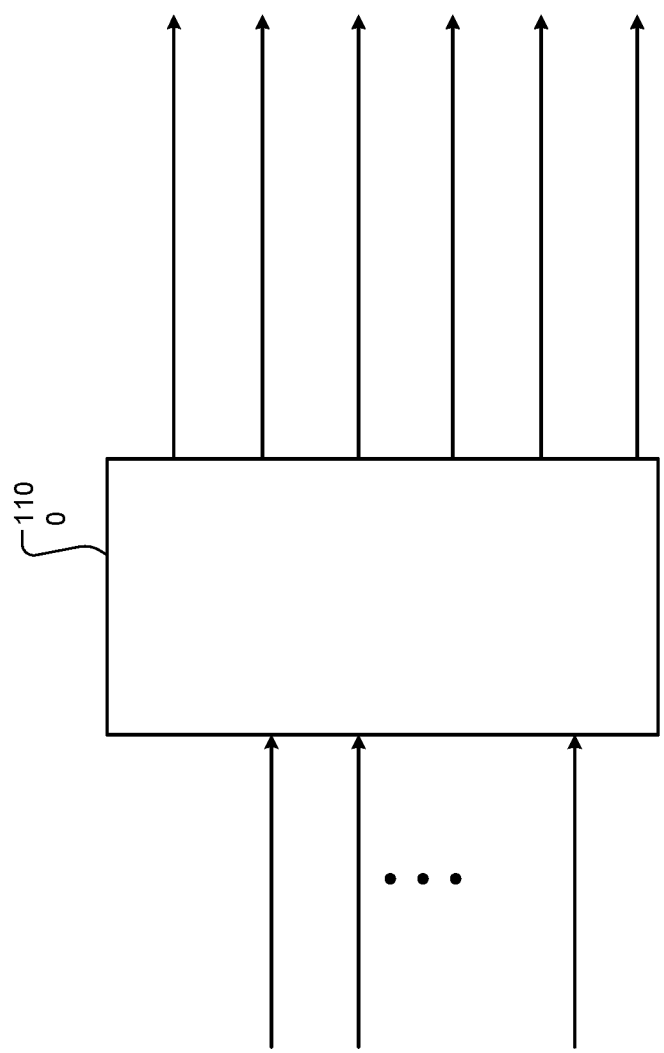
FIG. 11 is a functional block diagram of an example BMS module for an overall MODACS in accordance with an embodiment of the present disclosure.

FIG. 11 shows a BMS module 1100 for an overall MODACS. The BMS module 1100 may monitor parameters at a 12V level and/or at a 48V level. The BMS module 1100 may receive the outputs of the corresponding BMS modules at the group level (e.g., the outputs of the BMS module 1000 of FIG. 10) and based on this information generate instantaneous, short term, and continuous power and current limits for the overall MODACS.

The BMS modules of FIGS. 9-11 may be implemented separately from or as part of one of the MODACS 208, 330, 402, 502 of FIGS. 1-4 and/or corresponding MODACS control modules.

In an embodiment, the groups of a MODACS are connected in parallel, when a charge or discharge power demand is at or within a predetermined range of fully capacity of the MODACS. This may occur, for example, to provide 48V to a 48V starter during a cold start. In another embodiment, the BMS modules at the pack level calculate charge and discharge power and current limits while a certain number of groups are connected in parallel. This configuration provides partial power and current output depending on the number of groups connected in parallel.

A MODACS control module (e.g., one of the modules 240, 304, 503 of FIGS. 2, 3 and 5) may determine, when multiple groups are connected in parallel, SOC differentials between the weakest and strongest groups. The MODACS control module may avoid connecting the weakest and strongest groups in parallel if the SOC difference is greater than a predetermined threshold to avoid large circulating currents between the groups. The weakest group may have, for example, the lowest voltage and/or current levels, whereas the strongest group may have the highest voltage and/or current levels.

In an embodiment and for pack level discharge current demand, the MODACS control module determines the number of groups to be connected in parallel. The MODACS control module then selects the groups of the MODACS with the highest levels of SOC that when connected in parallel satisfy the discharge current demand while not exceeding predetermined parameter thresholds, as described above. In another embodiment and for pack level charge current demand, the MODACS control module determines the number of groups to be connected in parallel. The MODACS control module then selects the groups of the MODACS with the lowest levels of SOC that when connected in parallel satisfy the charge current demand while not exceeding predetermined parameter thresholds, as described above. The BMS modules that are at the pack level may update charge and discharge power and current limits of individual groups periodically (e.g., every 10 seconds) and select the most suitable groups depending on the charge and discharge demands.

The MODACS control module may select cells for a connected configuration based on use time, temperature, voltage, current level, current operating conditions of the corresponding vehicle, and/or other relevant parameters for that moment in time. The use time may refer to a sum of the amount of time the cell has received current and the amount of time the cell has discharged current over the lifetime of the cell. The MODACS control module may also prioritize loads and/or source terminals. As an example, certain 12V loads may have a higher priority level than 48V loads and thus power demands associated with the 12V loads are satisfied before satisfying power demands of the 48V loads. Similarly, other 12V loads may have a lower priority level than the 48V loads.

As another example, loads that are needed for safe vehicle operation may be prioritized at a higher level than other loads. Power to motors, power steering, brakes, and/or autonomous driving systems may have higher priority levels than, for example, seat heaters, radio, cabin lights, etc. The MODACS control module may determine amount of power that is needed to drive the corresponding vehicle from a current location to a safe location and allocate cells to satisfy this power before allocating cells for other loads. The MODACS control module may maintain a certain reserve power that is available for a predetermined period of time (referred to as a "hold-up time") should there be a loss in source power. This provides enough power for a vehicle to drive from a current location to a safe location. In an embodiment, the hold-up time is maximized in the event of a loss in power from a power source (e.g., a generator). Hold-up time may be provided for safety loads and/or other loads.

The MODACS control module may monitor states of health of cells and use the cells with a higher states of health, but limit power provided to or drawn from the used cells to prevent a large differential between the used cells and other cells (referred to as a "weak cell strong cell" condition). Cold cells tend to perform worse than warm cells.

The MODACS control module may also determine a number of groups to be connected in parallel to meet 12V loads, which have a high priority level. The number of groups may be determined based on vehicle operating parameters, MODACS parameters, load prioritization, source terminal prioritization, etc. The groups of the MODACS with highest SOCs may be selected to be connected in parallel to supply power to the 12V loads. This maximizes voltage to the 12V loads. This may be done for both safety and performance optimization reasons. For charging of cells, groups with the lowest SOCs may be charged. When a 12V load is at a minimum level, all groups of the MODACS may be connected in parallel to provide charge or discharge power at 48V. Under this condition, the last block in each connected series of blocks can be connected in parallel to support the 12V loads. For example, the blocks in the bottom row of the circuit of FIG. 17 may be used.

Power rails corresponding to safety loads may have a higher priority than power rails associated with other loads. Each power rail may have a minimum power capacity, which a MODACS control module may operate to satisfy. Providing power to the power rails with the higher priority prior to providing power to the power rails having lower priority. In an embodiment, power requirements are satisfied for a power rail having a highest priority level, and then the power requirements for the power rail having the next highest priority level are satisfied. One or more of the power rails having the lowest priority levels may not receive power.

Figure 12:
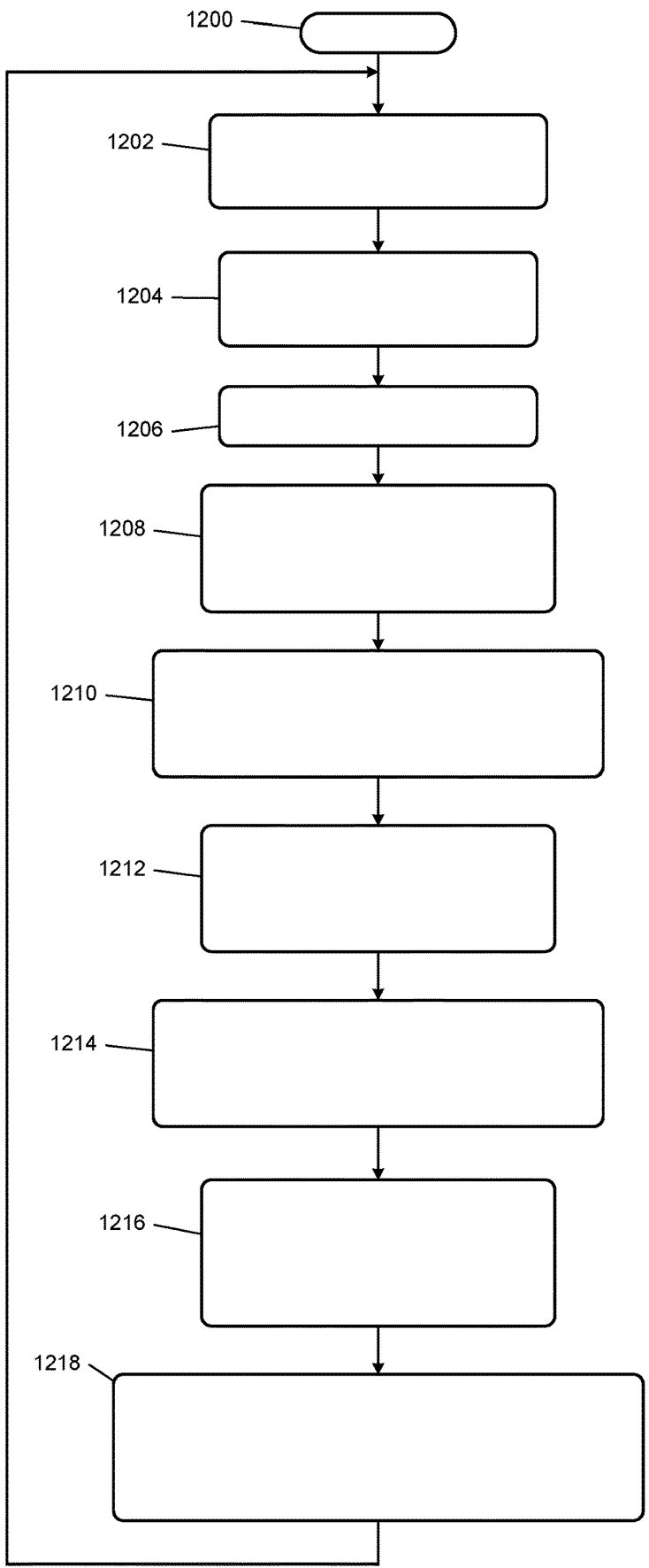
FIG. 12 illustrates an example method of reconfiguring a MODACS in accordance with an embodiment of the present disclosure.

The systems disclosed herein may be operated using numerous methods, example methods are illustrated in FIGS. 12-15. Although the following operations of FIGS. 12-15 are primarily described with respect to the implementations of FIGS. 1-11 and 17, the operations may be easily modified to apply to other implementations of the present disclosure. The operations in FIGS. 12-15 may be iteratively performed. In FIG. 12, a method of reconfiguring a MODACS is shown.

The method may begin at 1200. At 1202, the BMS modules (e.g., the BMS modules in FIGS. 9-11 may receive 12V pack level parameters including SOX values, maximum and minimum voltages, and power limits.

At 1204, certain ones of the BMS modules may calculate maximum charge and discharge current limits for each group. At 1206, certain ones of the BMS module may determine SOCs of the groups. At 1208, the BMS modules calculate maximum charge and/or discharge current limits of each set of groups of packs connected in parallel.

At 1210, the corresponding MODACS control module sets states of switches allocating groups and/or sets of groups with lowest SOCs for a 48V source terminal rather than for 12VA or 12VB source terminals. At 1212, the MODACS control module calculates maximum charge and/or discharge current limits of each group of 12V packs connected in parallel.

At 1214, the MODACS control module, based on the maximum charge and/or discharge current limits, sets states of the switches allocating the groups with 12V packs with highest SOCs for 12VA or 12VB source terminals rather than for the 48V source terminal. At 1216, the MODACS control module updates charge and/or discharge current limits based on voltages, temperatures, and/or SOX values of each of the packs of cells.

At 1218, the MODACS control module permits discharging at 48V, 12VA, 12VB source terminals with corresponding available power and current levels or charging at 48V, 12VA, 12VB source terminals for existing configuration of MODACS circuits and switch states. Operation 1202 may be performed subsequent to performing operation 1218.

Figure 13:
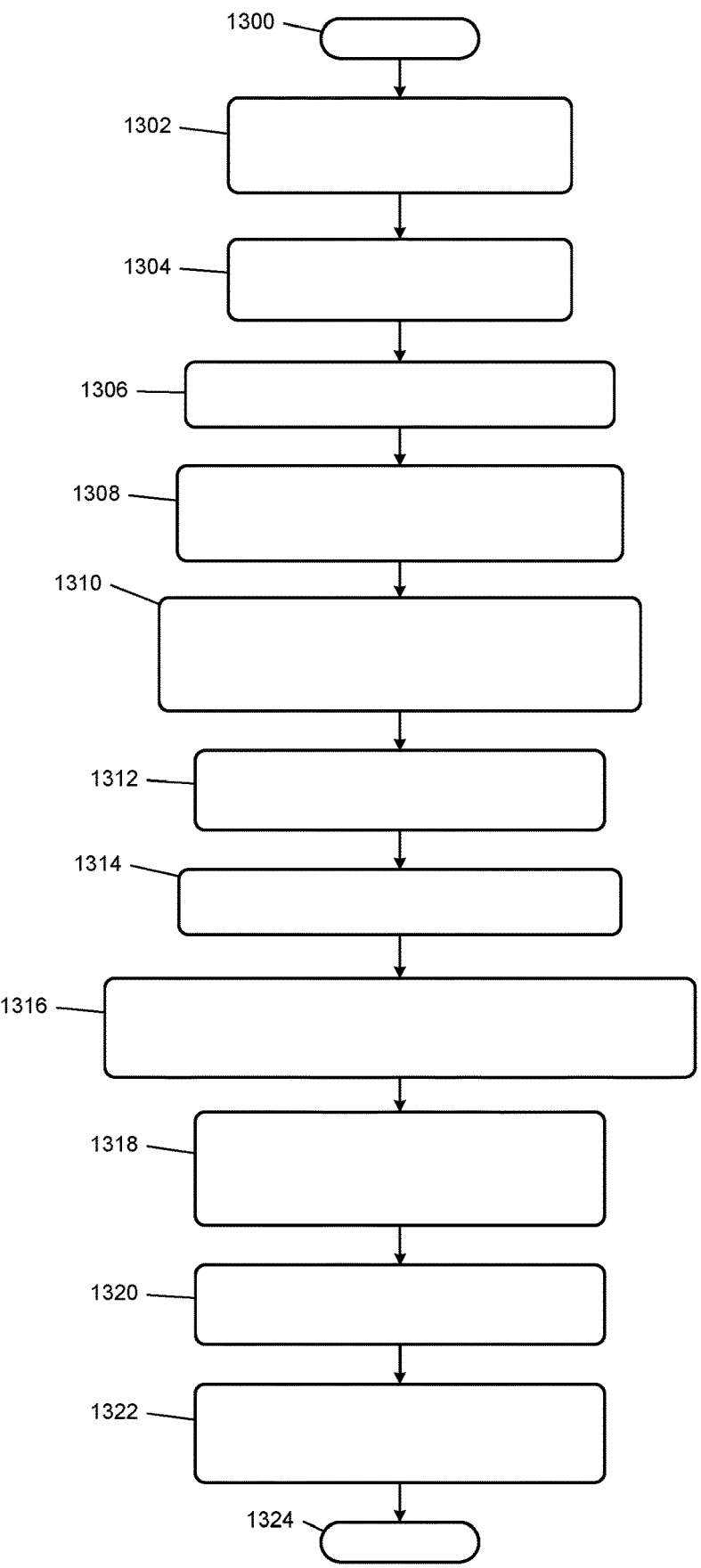
FIG. 13 illustrates an example method of controlling a MODACS during a regenerative/charging mode in accordance with an embodiment of the present disclosure.
Figure 14:
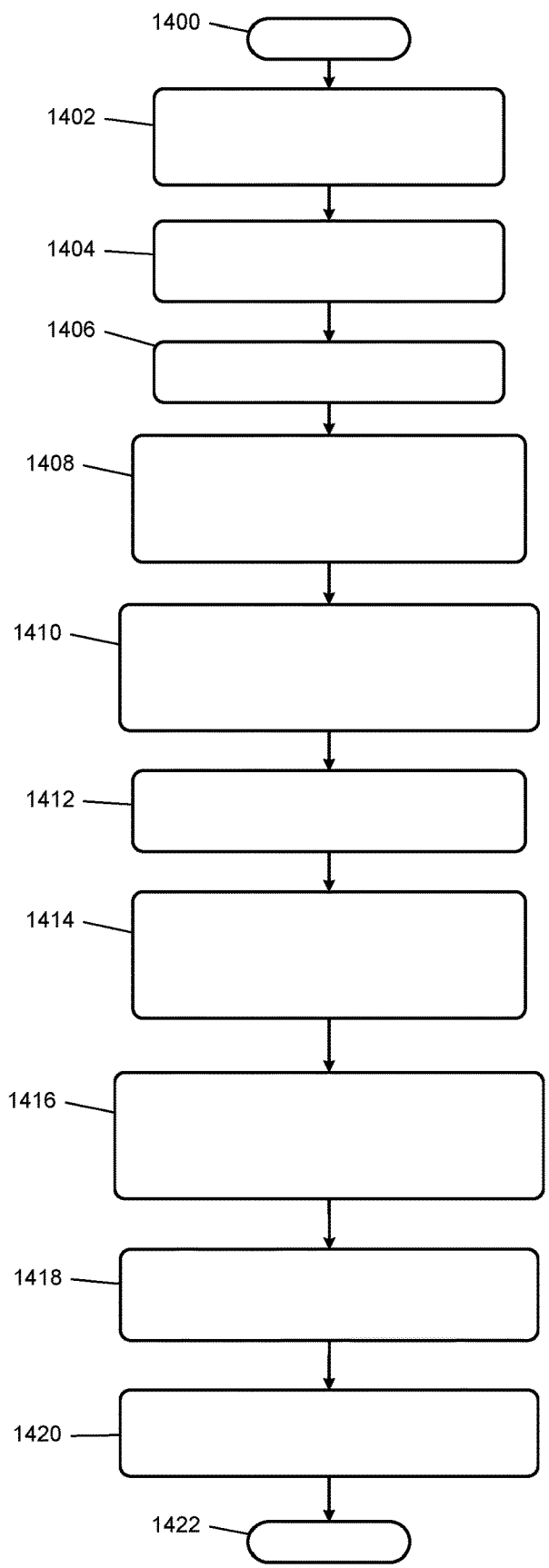
FIG. 14 illustrates an example method of controlling a MODACS during a boost/discharging mode in accordance with an embodiment of the present disclosure.
Figure 15:
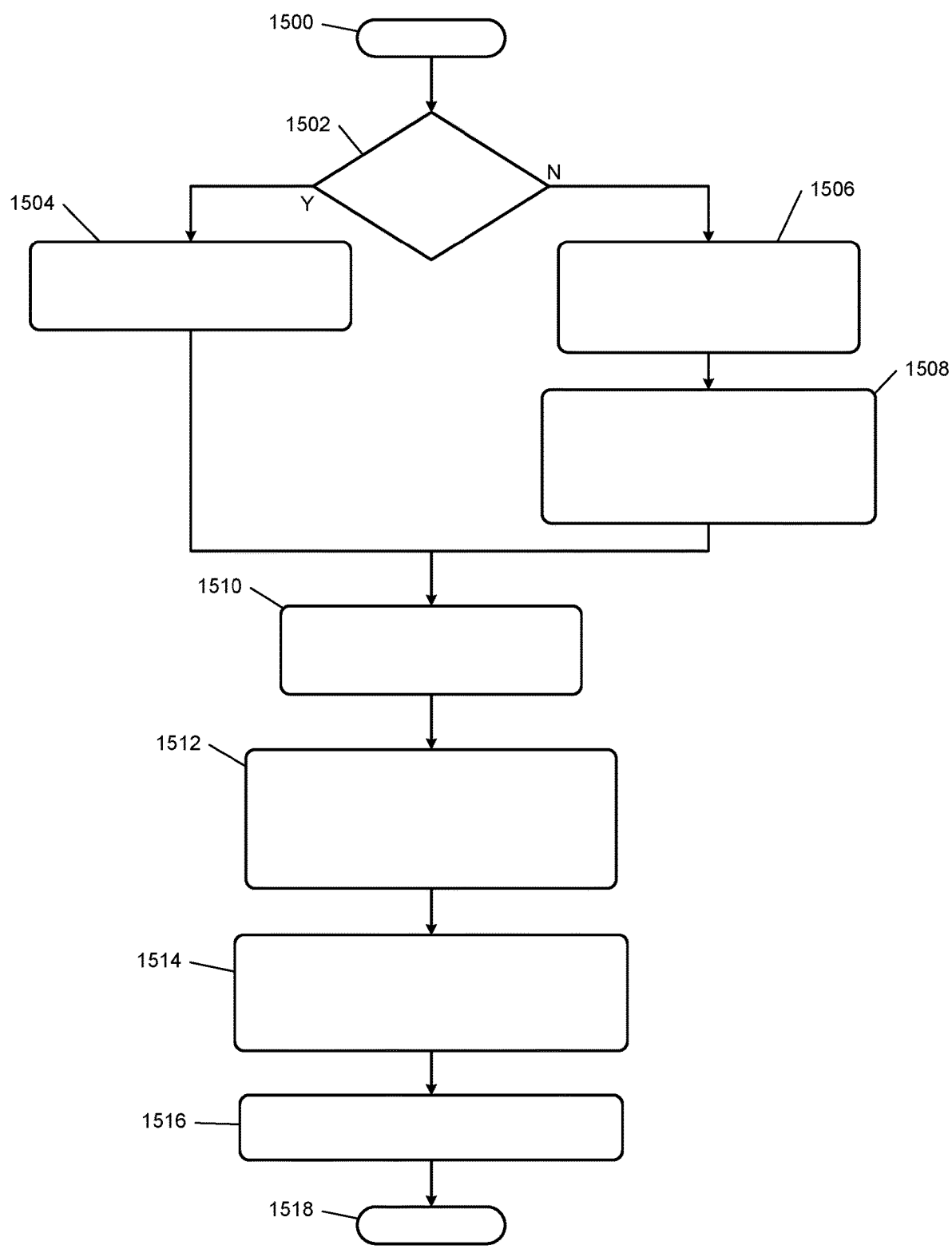
FIG. 15 illustrates an example method of controlling a MODACS during an autostart mode in accordance with an embodiment of the present disclosure.

The following methods of FIGS. 13-15 are methods for maximizing charge and discharge capabilities of a MODACS to support regenerative, boost and autostart modes of operation for dual voltage hybrid vehicle applications, where 2 or more source voltages are provided by the MODACS. Blocks of cells are reconfigured to provide maximum levels of charge and discharge values while maintaining cells within thermal operating ranges. The SOCs, voltages and temperatures of the cells are maintained within corresponding predetermined limits for safe operation of the MODACS during these operating modes.

The MODACS regenerative mode may be associated with vehicle coast down, opportunity charging, DFCO regenerative and/or electric vehicle regenerative modes of a vehicle. The MODACS boost mode may correspond to the engine assist mode of the vehicle. The MODACS autostart mode may correspond to the electric vehicle launch, engine start, and/or electric vehicle cruise modes of the vehicle.

The following methods include a MODACS control module obtaining charge and discharge power demands in the form of a request signal from a vehicle control module and determining a connected configuration of the cells of the MODACS. The MODACS allows blocks, packs, and groups of cells to be reconfigured to provide maximum charge and discharge currents without exceeding voltage and thermal limits. The MODACS determines the states of the switches to provide the packs and/or groups to satisfy the demands. Dual voltage outputs are provided while preventing voltage, SOC, and temperature limits from being exceeded. As an example, the groups with the lowest SOCs may be connected to absorb regenerative energy. The groups with the highest SOCs may be connected to provide maximum motoring power. The groups with the highest SOCs may be connected to provide maximum power during engine starts.

FIG. 13 shows a method of controlling a MODACS during a regenerative/charging mode. This method may be used to maximize charging power and current capability of the MODACS to absorb regenerative energy during a vehicle coast down (or charging) mode. Although the following operations are primarily described for groups of cells, similar operations may be performed for cell blocks and/or packs.

The method may begin at 1300. At 1302, the MODACS control module may receive a regenerative power and current request signal from the vehicle control module. The vehicle control module may send a regenerative power and current demands to the MODACS control module during, for example, the opportunity charging mode.

At 1304, the MODACS control module calculates maximum charge current limits for each group. At 1306, the MODACS control module determines SOCs for each of the groups. This may include generating a table that includes a list of the groups in order of the SOCs.

At 1308, the MODACS control module determines a number of groups and/or series of cell blocks to be connected in parallel to receive regenerative power based on the parameters determined at 1304 and 1306. The MODACS control module satisfies 12V regenerative loads of one or more 12V source terminals with first groups while using the groups with lowest SOCs for the 48V source terminal if possible.

At 1310, the MODACS control module may configure the cells as determined at 1308 to satisfy the 12V regenerative loads and if possible the 48V regenerative loads. At 1312, the MODACS control module may recharge the groups and/or series of cell blocks connected in parallel.

At 1314, the MODACS control module determines SOCs, voltages, and thermal limits of each remaining cell, block, pack and/or group.

At 1316, the MODACS control module, based on the determined SOCs, voltages and thermal limits and while ensuring that the 12V regenerative load requirements are satisfied, determines a set of the determined number of groups or series of cell blocks to be connected in parallel and charged.

At 1318, the MODACS control module may configure the cells as determined at 1316 to satisfy the 12V regenerative loads and if possible the 48V regenerative loads. At 1320, the MODACS control module may recharge the groups and/or series of cell blocks connected in parallel.

At 1322, the MODACS control module may output a signal indicating an available regenerative power and current limits to the vehicle control module. The method may end at 1324.

FIG. 14 shows a method of controlling a MODACS during a boost/discharging mode. This method may be used to maximize discharging power and current capability of the MODACS to provide a boost power during an engine torque assist mode.

The method may begin at 1400. At 1402, the MODACS control module receives a boost power and current request signal from the vehicle control module.

At 1404, the MODACS control module calculates a maximum discharge current limit for each group. At 1406, the MODACS control module determines SOCs for each group. At 1408, the MODACS control module determines a number of groups and/or series of cell blocks to connect in parallel to provide commanded boost power and current based on the current limit for each group. At 1410, the MODACS control module satisfies 12V loads of one or more 12V source terminals with first groups while using the groups with highest SOCs for the 48V source terminal if possible. The MODACS control module configures the cells as determined to satisfy the 12V load demands and to provide the commanded boost power and current.

At 1412, the MODACS control module determines the SOCs, voltages, and thermal limits of each of the cells. At 1414, the MODACS control module determines groups and/or series of cell blocks to be connected in parallel to provide commanded boost power and current based on the parameters determined at 1412. At 1416, the MODACS control module configures the cells as determined to satisfy the 12V load demands and to provide the commanded boost power and current. At 1418, the MODACS control module provides the commanded boost power and current at one of the source terminals.

At 1420, the MODACS control module provides available boost power and/or current limits to the vehicle control module. The method may end at 1422.

FIG. 15 shows a method of controlling a MODACS during an autostart mode. This method may be used to maximize discharging power and current capability of the MODACS to provide power required during autostart events to start an engine with a 12V or 48V starter.

The method may begin at 1500. At 1502, the MODACS control module checks whether the corresponding vehicle employs a 12V starter or a 48V starter. If the vehicle employs a 12V starter, then operation 1504 is performed, otherwise operation 1506 is performed. If operation 1506 is performed, then a 48V starter may be used to start the engine.

At 1504, the MODACS control module connects 12V packs in parallel to provide a maximum starting current capability at 12V. At 1506, the MODACS control module connects the groups and/or series of cell blocks in parallel to provide a maximum starting current capability at 48V. At 1508, the MODACS control module connects predetermined 12V blocks and/or packs or first row of 12V blocks and/or packs that are connected closest to a ground reference (such as the blocks in the bottom row of the circuit of FIG. 17) in parallel to supply 12V loads.

At 1510, the MODACS control module determines the SOCs, voltages, and thermal limits of each of the cells based on the parameters determined at 1510. At 1512, the MODACS control module determines which one or more series of cell blocks and/or packs to be connected in parallel to provide commanded power and current for an autostart. At 1514, the MODACS control module configures the cells including a connected configuration and setting states of switches of the MODACS to provide the commanded power and current. At 1516, the MODACS control module provides the commanded power and current to perform the autostart. The method may end at 1518.

The above-described operations of FIGS. 12-15 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 16:
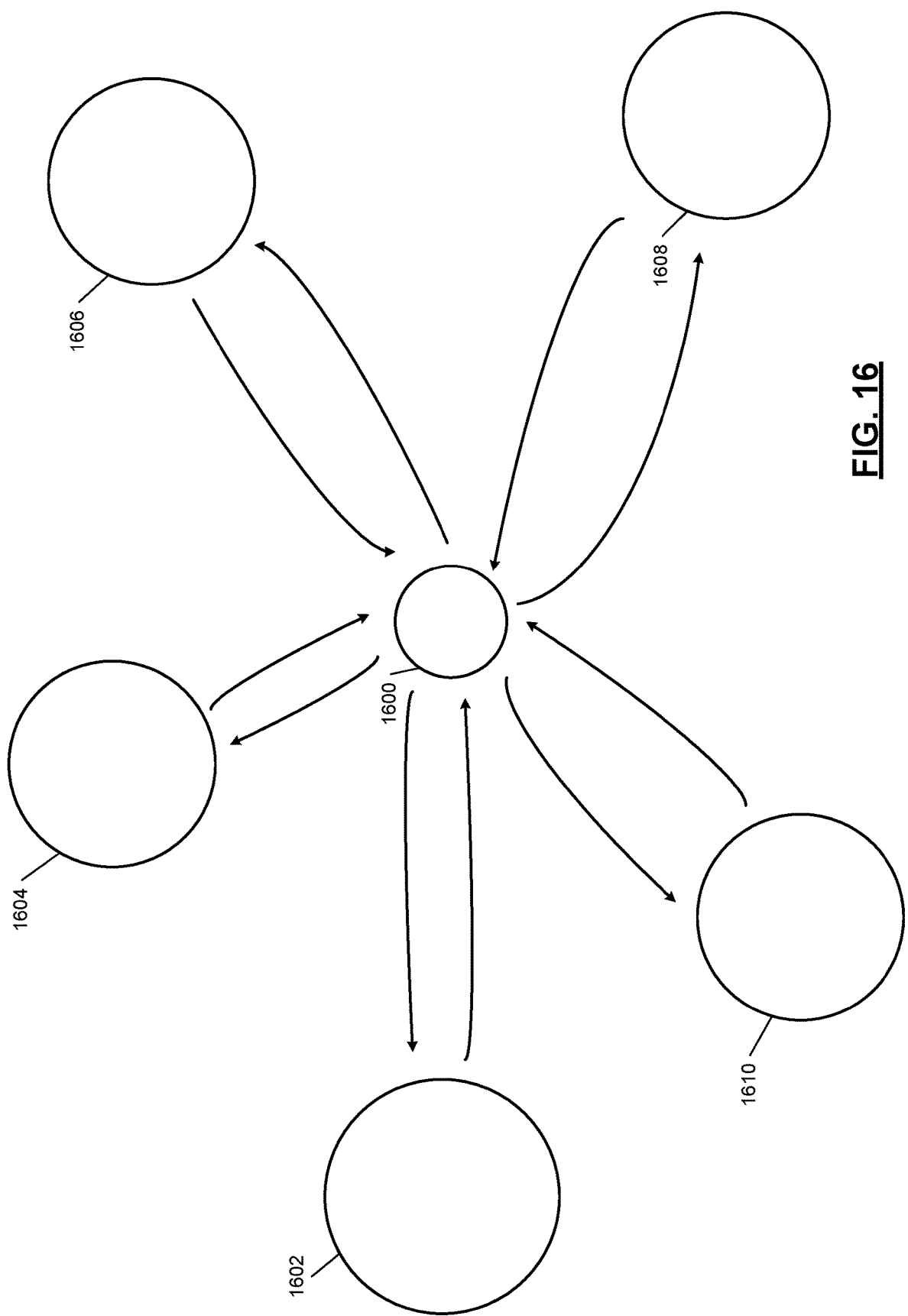
FIG. 16 is an example of a state diagram illustrating capacity reallocation for a MODACS in accordance with an embodiment of the present disclosure.

The following FIG. 16 and corresponding description is directed to providing autonomous capacity allocation for a MODACS. This is done to meet voltage regulation requirements for source terminals, safety power availability and back-up power time requirements. This includes determining cell, block, pack and group allocations based on vehicle operating mode, voltage regulation requirements, power demands, load and source terminal prioritization levels, and safety power availability and back-up power time requirements. Power at each power rail may be monitored and capacities may be automatically reallocated to meet corresponding loads based on changes in vehicle operating modes.

A capacity allocation algorithm is implemented based on a vehicle operating state configuration. A capacity allocation algorithm utilizes two or more voltage regulation windows and provides appropriate voltages for the appropriate time intervals at the source terminals. Load currents and hold-up times are utilized to allocate capacity (available power and current). Power domain prioritization is also utilized to allocate capacity. A power domain refers to power at a power rail and/or a source terminal of the MODACS. A MODACS may have any number of power domains. Two or more power domains may have a same priority level. Different power domains may have a same priority level, but have different back-up and/or hold-up time requirements, which may change over time. Minimum capacity requirements for each of the source terminals may also be taken into account when allocating capacity to the source terminals. The capacity determination may include determining the number of cells, blocks, packs and/or groups to connect in series and/or parallel for each source terminal.

Figure 17:
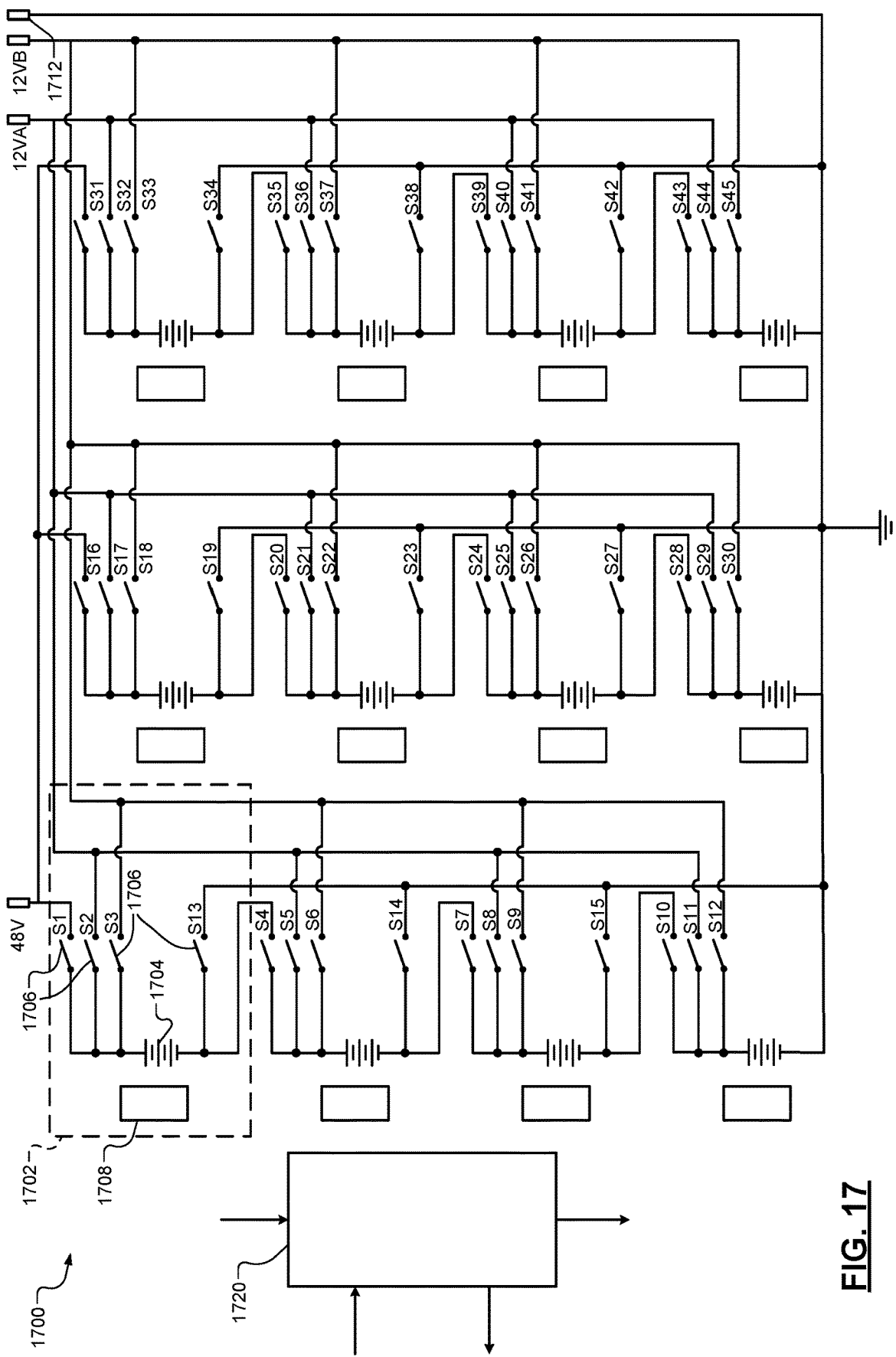
FIG. 17 is a schematic of an example MODACS circuit in accordance with an embodiment of the present disclosure.

The algorithm allows a multiple source terminal dynamic capacity system to allocate capacity either at a system (or hardware level) or with control logic integrated into the MODACS control module. The MODACS control module, based on information collected from sensors, allocates voltage and power to satisfy demands using a MODACS switch circuit, as shown in FIG. 2 or 17.

FIG. 16 shows a state diagram illustrating capacity reallocation for a MODACS. The MODACS control module may transition between any operating state (represented as state 1600) and one of states (or modes) 1602, 1604, 1606, 1608, 1610. This transitioning may be based on a capacity allocation algorithm and corresponding priority levels of loads and/or source terminals, voltage domain regulation requirements, voltage domain balancing ratios, minimum number of 12V blocks per source terminal, and/or other parameters. The stated parameters may be weighted differently and the resulting weighting may be used to determine the capacity allocations of the source terminals. This may be done at each of the states 1602, 1604, 1606, 1608, 1610. The weighting scheme may be different for each of the states 1602, 1604, 1606, 1608, 1610.

As an example, the algorithm may include setting a load balance (or priority rankings) for a normal operating mode. In the normal operating mode, the 12VA source terminal may have a highest priority level (Priority 1), the 12VB source terminal may have an intermediate priority level (Priority 2), and the 48V source terminal may have a lowest priority level (Priority 3). Based on this priority scheme, available power, available current, available capacity, and loading demands for each source terminal, power, current and/or capacity are allocated first to the 12VA source terminal, then to the 12VB source terminal and finally to the 48V source terminal. Depending on the available power, current and/or capacity, power is provided to the Priority 1 loads first and if there is any available power remaining, then Priority 2 loads are provided power. If there is any power remaining after satisfying power demands for the Priority 2 loads, then power is provided to the Priority 3 loads. This power provisioning may include supplying power to the Priority 1 loads while supplying power to the Priority 2 loads and/or the Priority 3 loads.

The MODACS control module may monitor power at each power rail of the source terminals and allocate and reallocate capacities to meet corresponding load demands for each vehicle and/or MODACS operating mode. Based on the power provided at each of the source terminals, the vehicle control module may determine which loads are to receive power. This may be based on power, current and/or capacity levels reported by the MODACS control module to the vehicle control module. In another embodiment, if the MODACS does not have enough power to satisfy the power demands for a source terminal, the MODACS module may not provide power to that source terminal or may provide an incremental amount to satisfy power demands for a portion of the loads connected to that source terminal. The MODACS control module may report the partial supply of power for the corresponding source terminal to the vehicle control module, which may then permit power to be received by the appropriate load(s), which may be based on priority levels of the load(s) receiving power from the partially power source terminal.

The MODACS module monitors for faults, such as faults with a power source (e.g., a generator) and faults associated with a power rail and/or source terminal. As an example, if there is a power loss from a generator, then the MODACS control module maximizes a hold-up time for safety loads to be able to supply power to vehicle driving loads (e.g., steering, braking, electric motor, etc.) to allow the vehicle to be driven to a safe location. Other loads of less priority may not be supplied with power in this situation.

As an example, the voltage domain regulation requirements may include setting: (i) a maximum Priority 1 voltage change equal to a 12VA maximum voltage change; (ii) maximum Priority 3 voltage change equal to a 12VB maximum voltage change; and (iii) maximum Priority 2 voltage change equal to a 48V maximum voltage change. The voltage domain balancing ratios for Priorities 1-3 may be represented respectively by equations 1-3.

$$\text{Power}_{PR1} = \text{ABS}(\text{Current}_{PR1})*(\text{Target Voltage}_{PR1}/\text{Maximum Voltage Change}_{PR1}) \quad (1)$$

$$\text{Power}_{PR2} = \text{ABS}(\text{Current}_{PR2})*(\text{Target Voltage}_{PR2}/\text{Maximum Voltage Change}_{PR2}) \quad (2)$$

$$\text{Power}_{PR3} = \text{ABS}(\text{Current}_{PR3})*(\text{Target Voltage}/\text{Maximum Voltage Change}_{PR3}) \quad (3)$$

The minimum number of 12V blocks per source terminal may be determined by setting: the Priority 1 minimum number of blocks equal to the 12VA minimum number of blocks; the Priority 3 minimum number of blocks equal to the 12VB minimum number of blocks; and the Priority 2 minimum number of blocks equal to the 48V minimum number of blocks.

As an example, the block assignment (or allocation for the priorities 1-2 may be represented by equations 4-5, where: MAX (A, B) is the maximum number of A and B; Round is a function that rounds to a nearest integer; MIN(x, y) is the minimum number of x and y; $\text{MIN}_{PR1}$ is the minimum number of priority 1 blocks; and $\text{MIN}_{PR2}$ is the minimum number of Priority 2 blocks.

$$\text{Block assignment}_{PR1} = \text{MAX}(\text{Round}(\text{Power}_{PR1}/(\text{Power}_{PR1}+\text{Power}_{PR2}+\text{Power}_{PR3})*\text{Total Number of Blocks}), \text{MIN}_{PR1}) \quad (4)$$

$$\text{Block assignment}_{PR2} = \text{MAX}(\text{Round}(\text{Power}_{PR2}/(\text{Power}_{PR2}+\text{Power}_{PR3})*(\text{Total Number of Blocks-number of Priority 1 Blocks})), \text{MIN}(\text{minimum number of Priority 2 blocks}, (\text{total number of blocks-number of Priority 1 blocks}))) \quad (5)$$

The block assignment for Priority 3 is set equal to 0 (i.e. 12VB source terminal is OFF) if the total number of blocks minus the number of Priority 1 blocks minus the number of Priority 2 blocks is less than the minimum number of Priority 3 blocks, otherwise the block assignment for Priority 3 is set equal to the total number of blocks minus the number of Priority 1 blocks minus the number of Priority 2 blocks.

The load current may be equal to a sum of external load currents and current going to load balance cells supplying power on other power rails. Instead or in addition to using power rates (or power levels associated with the source terminals) for calculations, SOC changes and/or current drains may be used for the above-described calculations. The calculations described herein may be similarly performed for any number of power domains (i.e. source terminals and/or power rails). A sampling rate and averaging time associated with detected parameters may be adjusted by the MODACS control module to improve algorithm power consumption, charging power, load demands and voltage regulation accuracy. Charging and discharging may be handled separately rather than using the absolute current draw while allowing for different ranges for maximum voltage increases and maximum voltage decreases. The stated calculations may be based on and/or include calculations for a minimum hold-up time to capture back-up power hold-up time requirements for each power domain.

Referring again to FIG. 16, a current state (e.g., state 1600) may transition to the normal operating state 1602 (or normal operating mode), for example, when autonomous capacity allocation is ON and no fault is detected with a generator and/or a source terminal. The autonomous capacity allocation may refer to the MODACS control module automatically determining a connected configuration and setting switch states as described above. The normal mode may include a predetermined set of load priorities and settings. Example normal mode priorities are described above. Minimum 12V block allocations may be set according to the normal mode priorities and settings. The MODACS control module may transition out of the normal operating mode when the autonomous capacity allocation is OFF.

The MODACS control module may transition to the generator fault state 1604 when there is a fault detected at a generator (or SGU) and the autonomous capacity allocation is ON. This may be reported to the MODACS control module by the vehicle control module. The MODACS control module sets load priorities to generator fault settings and sets minimum 12V block allocations to generator fault settings. This may include as described above allocating power to safety loads and minimizing and/or stopping power delivery to other loads.

The MODACS control module may transition to the 48V (or first source terminal) fault state 1606 when there is a fault associated with the 48V (or first voltage potential) power rail and/or first source terminal and the autonomous capacity allocation is ON. In the 48V fault state, the MODACS control module turns the 48V source terminal OFF, sets the 48V current to 0, and sets the 48V minimum number of blocks to 0. When there is no 48V under voltage or 48V over voltage condition at the corresponding power rail and/or that would cause a 48V under voltage or a 48V over voltage condition to exist at the corresponding power rail, then the MODACS control module transitions from the 48V fault state 1606.

The MODACS control module may transition to the 12VA (or second source terminal) fault state 1608 when there is a fault associated with the 12VA (or second voltage potential) power rail and/or second source terminal and the autonomous capacity allocation is ON. In the 12VA fault state, the MODACS control module turns the 12VA source terminal OFF, sets the 12VA current to 0, and sets the 12VA minimum number of blocks to 0. When there is no 12VA under voltage or 12VA over voltage condition at the corresponding power rail and/or that would cause a 12VA under voltage or a 12VA over voltage condition to exist at the corresponding power rail, then the MODACS control module transitions from the 12VA fault state 1608.

The MODACS control module may transition to the 12VB (or third source terminal) fault state 1610 when there is a fault associated with the 12VB (or third voltage potential) power rail and/or third source terminal and the autonomous capacity allocation is ON. In the 12VB fault state, the MODACS control module turns the 12VB source terminal OFF, sets the 12VB current to 0, and sets the 12VB minimum number of blocks to 0. When there is no 12VB under voltage or 12VB over voltage condition at the corresponding power rail and/or that would cause a 12VB under voltage or a 12VB over voltage condition to exist at the corresponding power rail, then the MODACS control module transitions from the 12VB fault state 1610.

The above-described algorithm when implemented includes capacity allocation based on: vehicle operating state (or mode); states of power rails; load current; power rail hold-up time; power supplied to loads; rate of capacity changes for each source terminal, power rail, and/or MODACS as a whole; power domain (or rail) prioritization; and minimum capacity requirements for each of the source terminals. The algorithm includes usage of an allowed voltage regulation window for each source terminal.

Figure 18:
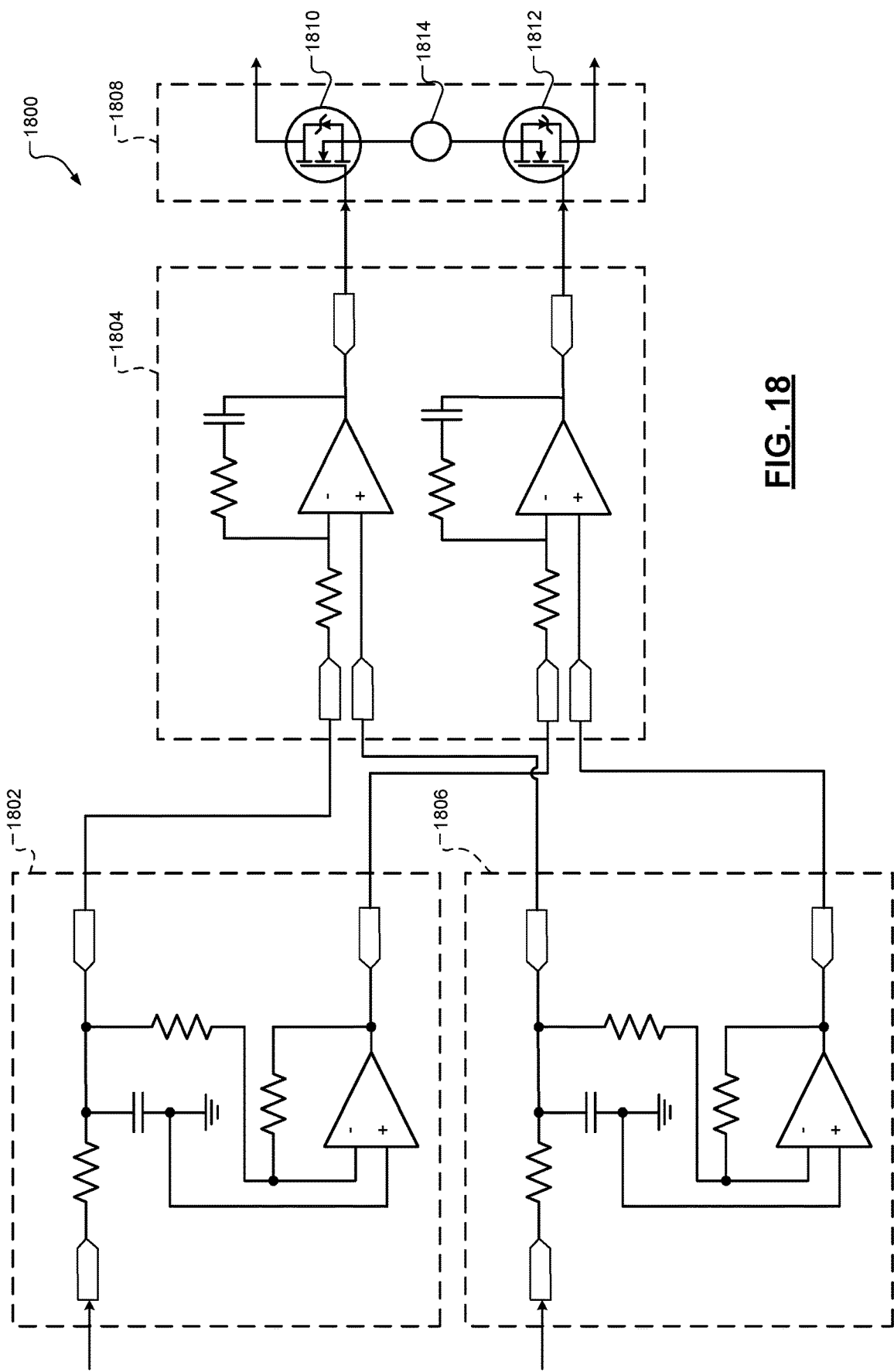
FIG. 18 is a schematic of an example switch control circuit in accordance with an embodiment of the present disclosure.

The following FIGS. 17-18 are directed to an example MODACS circuit 1700 as shown in FIG. 17. These examples are for a MODACS including one or more source terminals. The MODACS circuit 1700 may include multi-functional solid-state switches, switch drive circuits, current and voltage sense circuits arranged in a minimum switch count topology to enable on-demand capacity allocation for source terminals having similar or dissimilar preset (or target) voltages. The MODACS circuit 1700 is flexible, modular, and has minimum size, complexity, weight, and component count. For at least these reasons, the MODACS circuit 1700 minimizes manufacturing difficulty.

As shown, the MODACS circuit 1700 includes blocks, where each block includes one or more cells, 4 or more switches, a BMS module and source terminals with corresponding power rails. An example block 1702 is outlined and includes one or more cells 1704, 4 switches 1706 and a BMS module 1708. Three of the switches 1706 connect the cell(s) 1704 respectively to source terminals (e.g., a 48V, 12VA, and a 12VB source terminals are shown). The fourth one of the 4 switches 1706 connects the cells(s) 1704 to a ground reference (or negative terminal) 1712.

As shown the blocks may be arranged in an array having rows and columns. Each of the blocks may be configured the same except one of the rows closest to the ground reference. In this row, each of the blocks includes three switches instead of four switches. As a result, the corresponding cells are connected to the ground reference without use of switches, as shown.

As can be seen from FIG. 17, the cell(s) of each of the blocks may be connected to each of the source terminals. Any cell may be connected to any one or more of the source terminals. The first switches in the blocks in one of the rows (or first row) may be connected to the first source terminal (48V source terminal). The first switches in the blocks in one or more intermediate rows (e.g., the second and third rows) may be connected to cell(s) in a previous row. This allows the cell(s) in the blocks in each column to be connected in series. Under certain conditions, the blocks in columns are connected in series to form two or more series of blocks and the multiple series of blocks are connected in parallel to maximize power to the first source terminal.

The MODACS circuit 1700 further includes a MODACS control module 1720 that controls states of the blocks. The MODACS control module 1720 receives BMS signals from the BMS modules and a system capacity request signal from a vehicle control module. Based on priorities of the voltage source terminals, parameters, and power and current demands indicated by the system capacity request signal, the MODACS control module 1720 determines a connected configuration and sets states of the switches of the blocks. The parameters may include voltages, power levels, current levels, and temperatures indicated in the BMS signals. The MODACS control module 1720 generates an actual capacity allocation signal indicating capacity allocation for the source terminals. The actual capacity allocation may not match the requested capacity allocation depending on: the state of the MODACS including whether there is any faults or shorts;

and the SOH of the cells. The actual capacity allocation signal may be transmitted from the MODACS control module 1720 to the vehicle control module.

The MODACS circuit 1700 includes a 12V switching matrix, architecture, and switch controls to enable elimination of 12V stabilization using a DC-to-DC converter, such as a 48V to 12V DC-to-DC buck or boost converter, and/or elimination of 12V and/or 48V redundant back-up power. The MODACS circuit 1700 has a minimal circuit, block, switch configuration for one high power, high voltage (e.g., V1 greater than or equal to 24V) source terminal and at least two low power, low voltage (e.g., two 12V) source terminals. The switches may be solid-state switches for fast noise free reconfiguring. The switches may be configured for bi-directional voltage and current blocking capability to prevent shorts between high and low voltage source terminals. Switches configured for unidirectional voltage and current blocking may be used to minimize losses selectively.

The switches may be implemented in a single chip or in a multi-chip package. The switches may include enhancement mode silicon metal-oxide-semiconductor field-effect-transistors (MOSFETs), gallium nitride (GaN) FETs, silicon carbide (SiC) MOSFETS, insulated-gate bipolar transistors (IGBTs), and/or other switches. The switches may be in an ON state, an OFF state, or a linear operating state for impedance matching purposes. The switches may be integrated together with drivers and interlock logic to prevent short circuits between blocks, between different source terminals, and between a source terminal and a ground reference. The switches are controlled to achieve a desired capacity at each source terminal based on vehicle control module demands and status updates in the form of feedback signals from the BMS modules of the blocks.

In an embodiment, the cells are lithium battery cells, but may be other types of cells. The example of FIG. 17 is shown to illustrate a minimalistic architecture having a minimal number of blocks and switches per block to provide 48V, 12VA and 12VB outputs without a DC-to-DC converter.

As an example, the MODACS circuit 1700 may include 12V, 6 amp hour (Ah) blocks that may be connected in series and in parallel as described above to provide a 48V output for 72Ah. Table 1 provides an example amp hour allocation for the three source terminals and corresponding vehicle operating modes. The table also indicates whether standby, crank, stabilization, energy, safety and/or other operating characteristic is being prioritized and/or maximized.

TABLE 1

| Amp Hour Allocation Per Vehicle Operating Mode | | | | |
|---|---|---|---|---|
| Vehicle Operating Mode | 48 V-First Source Terminal | 12 VA-Stabilized, Second Source Terminal | 12 VB-Third Source Terminal | Operating Characteristic |
| OFF Test Mode | 0 Ah | 0 Ah | 72 Ah | Standby Loads Have Highest Priority Level |
| Auxiliary Mode | 0 Ah | 0 Ah | 72 Ah | Standby Loads Have Highest Priority Level |

TABLE 1-continued

| Amp Hour Allocation Per Vehicle Operating Mode | | | | |
|---|---|---|---|---|
| Vehicle Operating Mode | 48 V-First Source Terminal | 12 VA-Stabilized, Second Source Terminal | 12 VB-Third Source Terminal | Operating Characteristic |
| Cold Cranking Mode | 0 Ah | 0 Ah | 72 Ah | Crank Loads Have Highest Priority Level |
| Run Mode | 6 Ah | 24 Ah | 24 Ah | Safety Loads Have Highest Priority Level |
| 12 V Autostart Mode | 0 Ah | 24 Ah | 48 Ah | Stabilization Given highest Priority Level |
| Regenerative or Boost Mode 12 V Stabilized Fault Mode | 12 Ah 6 Ah | 12 Ah 0 Ah | 12 Ah 48 Ah | Energy Maximized Safety Loads Have Highest Priority Level |
| 12 V Fault Mode | 6 Ah | 48 Ah | 0 Ah | Safety Loads Have Highest Priority Level |
| Charging Source Fault Mode (Generator, Advanced Power Management (APM), or Other Fault) | Allocation Base on Load Prioritization | Allocation Base on Load Prioritization | Allocation Base on Load Prioritization | Safety Loads have Highest Priority Level |

Certain minimum quantized amp hours may be determined for each source terminal based on size of the blocks (i.e. the number of cells, voltage ratings, current ratings, etc. of the one or more cells in each block). Manufacturing and warranty test may be performed to test the MODACS in a single 12V mode to simply testing and servicing.

FIG. 18 shows an example switch control circuit 1800. A portion or all of the switch control circuit 1800 may be implemented in a MODACS control module. Each switch in the MODACS circuit 1700 of FIG. 17 may have a corresponding switch control circuit 1800 as shown in FIG. 18.

The switch control circuit 1800 may include a pulse width modulation (PWM) filter and limit circuit 1802, proportional and integral loops 1804, and a current conditioning circuit 1806, which are used to control a state of a switch circuit 1808. The switch circuit 1808 may represent and/or replace any one of the switches in FIG. 17.

The PWM filter and limit circuit 1802 may receive a PWM control signal from the MODACS control module 1720 of FIG. 17, filter and amplify the PWM control signal to generate output signals, and limit the output signals to be within predetermined ranges. The output signals are provided to the proportional and integral loops 1804, which include amplifiers that minimize current errors. The proportional and integral loops 1804 minimize errors between the outputs of the PWM filter and limit circuit 1802 and the current conditioning circuit 1806 while generating output signals that are provided to the one or more switches of the switch circuit 1808.

The switch circuit 1808 may include the one or more switches (two switches 1810, 1812 are shown) and a current sensor 1814, which may be connected in series, as shown. The current sensor 1814 detects current passing through the one or more switches and generate a current signal. The current conditioning circuit 1806 filters and amplifies the current signal to generate outputs that are provided to the proportional integral loops 1804.

The switches of the switch circuit 1808 may include any of the above-stated switches. The switches may be uni-directional or bi-directional switches. When the switches are uni-directional, the switches are used to block voltage and current for either charging or discharging purposes, not for both charging and discharging purposes. In one embodiment, the switches include two bi-directional switches that are used to block voltage and current in a first direction when charging and in a second direction when discharging. The switches may include N-channel FETs as shown or other types of transistors.

In an embodiment, the switches may be in an ON state, an OFF state, or a linear operating state. When the signals received by control terminals of the switches have a duty cycle in a first range (e.g., 0-10%), the switches are in the OFF state to block voltage and current. When the switches receive signals having a duty cycle in a second range (e.g., 90-100%), the switches are in the ON state. When the switches receive signals having a duty cycle in a third range (e.g. 10-90%), the switches may be linearly operated. This allows the amount of current passing through the switches to be adjusted.

The number of rows, columns, blocks, switches per block, total number of switches, number of priority levels, number of power rails and/or source terminals, number of serially connected blocks, and number of parallel connected blocks of a MODACS circuit determines the granularity, selectivity and flexibility in allocating power to each of the source terminals. Each block may have any number of cells and associated amp hours, voltages, power levels, and current levels.

Table 2 provides example switch states for different vehicle operating modes for the MODACS circuit of FIG. 17 including corresponding amp hours for each operating mode.

TABLE 2

Switch States for Vehicle Operating Modes

| Vehicle Operating Mode | 48 V-First Source Terminal | 12 VA-Second Source Terminal | 12 VB-Third Source Terminal | Switches ON | Switches OFF or Locked Out |
|---|---|---|---|---|---|
| OFF Test Mode | 0 Ah | 0 Ah | 72 Ah | S3, S6, S9, S12, S13, S14, S15, S18, S19, S22, S23, S26, S27, S30, S33, S34, S37, S38, S41, S42, S45 | Other Switches of Blocks |
| Auxiliary Mode | 0 Ah | 0 Ah | 72 Ah | S3, S6, S9, S12, S13, S14, S15, S18, S19, S22, S23, S26, S27, S30, S33, S34, S37, S38, S41, S42, S45 | Other Switches of Blocks |
| Cold Crank Mode | 0 Ah | 0 Ah | 72 Ah | S3, S6, S9, S12, S13, S14, S15, S18, S19, S22, S23, S26, S27, S30, S33, S34, S37, S38, S41, S42, S45 | Other Switches of Blocks |
| Run Mode | 6 Ah | 24 Ah | 24 Ah | S1, S4, S7, S10, S17, S19, S21, S23, S25, S27, S29, S33, S34, S37, S38, S41, S42, S45 | Other Switches of Blocks |
| 12 V Autostart Mode | 0 Ah | 24 Ah | 48 Ah | S2, S5, S8, S11, S13, S14, S15, S18, S19, S22, S23, S26, S27, S30, S33, S34, S37, S38, S41, S42, S45 | Other Switches of Blocks |
| Regenerative Boost Mode | 12 Ah | 12 Ah | 12 Ah | S1, S4, S7, S10, S16, S20, S24, S28, S32, S34, S36, S38, S41, S42, S45 | Other Switches of Blocks |
| 12 VA Fault Mode | 6 Ah | 0 Ah | 48 Ah | S1, S4, S7, S10, S17, S19, S22, S23, S26, S27, S30, S33, S34, S37, S38, S41, S42, S45 | Other Switches of Blocks |
| 12 VB Fault Mode | 6 Ah | 48 Ah | 0 Ah | S1, S4, S7, S10, S17, S19, S21, S23, S25, S27, S29, S32, S34, S36, S38, S40, S42, S44 | Other Switches of Blocks |

While the exemplary switch logic associated with Table 2 is one possible switch combination example, of switch ON states per vehicle operating modes, the stated modes may be satisfied by providing other connected configurations with corresponding different switch states. For example, in the run mode, instead of having switches S1, S4, S7 and S10 be in an ON state, the switches in another column, such as switches S16, S20, S24, S28 may be in an ON state.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A modular dynamically allocated capacity storage system (MODACS) comprising:
   a housing comprising
      a plurality of positive output source terminals supplying power at a first voltage potential to a first plurality of loads and power at a second voltage potential to a second plurality of loads,
      a plurality of switches,
      a plurality of cells configured to supply power to each of the plurality of positive output source terminals based on states of the plurality of switches, wherein the plurality of cells are configured to selectively supply power to (i) the first plurality of loads via a first positive output source terminal, and (ii) the second plurality of loads via a second positive output source terminal, and wherein the plurality of positive output source terminals include the first positive output source terminal and the second positive output source terminal, and
      a plurality of sensing modules configured to determine parameters of each of the plurality of cells and generate corresponding status signals; and a control module configured to receive a power request signal, and based on the power request signal and the parameters of each of the plurality of cells, (i) determine a connected configuration for the plurality of cells relative to each other and the plurality of positive output source terminals, (ii) set states of the plurality of switches according to the connected configuration, and (iii) satisfy load requirements for the second positive output source terminal before satisfying load requirements for the first positive output source terminal.

2. The MODACS of claim 1, wherein the control module is configured to:
connect the plurality of cells in a plurality of packs and connect the plurality of packs in a plurality of groups, wherein each of the packs includes one or more of the plurality of cells, and wherein each of the plurality of groups includes one or more of the plurality of packs;
determine voltages, temperatures, current levels and states of charge for each of the plurality of packs, each of the plurality of groups and an overall circuit of the plurality of groups including pack specific parameters specific to each of the plurality of packs, group specific parameters specific to each of the plurality of groups, and parameters specific to the overall circuit; and
determine the connected configuration based on the pack specific parameters, the group specific parameters and the parameters specific to the overall circuit.

3. The MODACS of claim 1, wherein the control module is configured to:
determine at least one of states of charge, states of health, or states of function for each of the plurality of cells, each of a plurality of packs, each of a plurality of groups and an overall circuit of the plurality of groups, wherein each of the plurality of packs includes one or more of the plurality of cells, wherein each of the plurality of groups includes one or more of the plurality of packs, and wherein the overall circuit includes the plurality of groups; and
determine the connected configuration based on the at least one of the states of charge, the states of health, or the states of function.

4. The MODACS of claim 1, wherein the control module is configured to determine the connected configuration to maximize power levels and current levels at each of the plurality of positive output source terminals while satisfying demands for each of the plurality of positive output source terminals and while not exceeding at least one of predetermined voltages, predetermined thermal limits, predetermined state of charge limits, predetermined state of health limits, or predetermined state of function limits.

5. The MODACS of claim 1, wherein the control module is configured to
determine voltages, temperatures and current levels of the plurality of cells, a plurality of packs, a plurality of groups and an overall circuit, wherein each of the packs includes one or more of the plurality of cells, wherein each of the plurality of groups includes one or more of the plurality of packs, and wherein the overall circuit includes the plurality of groups;
determine instantaneous power and current limits, short-term power and current limits, and extended period power and current limits for at least one of the plurality of cells, the plurality of packs, the plurality of groups or the overall circuit; and
determine the connected configuration based on the instantaneous power and current limits, short-term power and current limits, and extended period power and current limits.

6. The MODACS of claim 1, wherein the control module is configured to:
determine voltages, temperatures, and current levels of sets of cells, wherein each of the sets includes one or more cells;
determine instantaneous power and current limits, short-term power and current limits, and continuous power and current limits of each of the sets of cells; and
selectively connect the each of the sets of cells to one or more of the plurality of positive output source terminals based on the voltages, temperatures, current levels, instantaneous power and current limits, short-term power and current limits, and continuous power and current limits.

7. The MODACS of claim 1, wherein the control module is configured to:
connect the plurality of cells in groups;
determine a state of charge of each of the groups; and
for a discharge current demand,
based on the states of charge of the groups, determine a number of the groups to connect in parallel, and
select ones of the groups with highest states of charge to connect in parallel to form a parallel circuit while not connecting the other ones of the groups to the parallel circuit.

8. The MODACS of claim 1, wherein the control module is configured to:
connect the plurality of cells in groups;
determine a state of charge of each of the groups; and
for a charge current demand,
based on the states of charge of the groups, determine a number of the groups to connect in parallel, and
select ones of the groups with lowest states of charge to connect in parallel to form a parallel circuit while not connecting the other ones of the groups to the parallel circuit.

9. The MODACS of claim 1, wherein the control module is configured to:
determine priority levels of the plurality of positive output source terminals;
connect the plurality of cells in groups based on the priority levels;
determine states of charge of the groups;
based on the states of charge, determine a number of the groups to connect in parallel to satisfy high priority safety loads; and
connect the number of the groups with highest states of charge in parallel to satisfy the high priority safety loads.

10. The MODACS of claim 1, wherein the control module is configured to:
determine if 12V load demand is less than a predetermined amount; and
if the 12V load demand is less than the predetermined amount, connect the plurality of cells in groups and connect the groups in parallel to maximize power to one of the plurality of positive output source terminals,
wherein the one of the plurality of positive output source terminals is a 48V source terminal.

11. The MODACS of claim 1, wherein the control module is configured to:
determine priority levels of the plurality of positive output source terminals;

connect the plurality of cells in groups based on the priority levels;

determine states of charge of the groups;

based on the states of charge, determine a number of the groups to connect in parallel to satisfy 48V loads; and connect the number of the groups with lowest states of charge in parallel to satisfy the 48V loads.

12. The MODACS of claim 1, wherein the control module is configured to monitor states of the plurality of cells and control states of the plurality of switches to prevent at least one of states of charge, voltages or temperatures of the plurality of cells from going outside of one or more predetermined ranges.

13. The MODACS of claim 1, wherein:

the plurality of positive output source terminals comprise a first source terminal and a second source terminal; and the control module configured to (i) determine whether a predetermined type of starter is used to start an engine, and (ii) based on the parameters and whether the predetermined type of starter is used, (a) connect packs of the plurality of cells in parallel to maximize current capability for the second source terminal, or (b) connect multiple series of blocks of the plurality of cells in parallel to provide a maximum starting current for the first source terminal.

14. The MODACS of claim 1, wherein the plurality of positive output source terminals are mounted on an exterior of the housing.

15. A modular dynamically allocated capacity storage system (MODACS) comprising:

a housing comprising
a plurality of positive output source terminals supplying power at a first voltage potential to a first plurality of loads via a first source terminal and power at a second voltage potential to a second plurality of loads via a second source terminal,
a plurality of switches,
a plurality of cells configured to supply power to each of the plurality of positive output source terminals based on states of the plurality of switches, and
a plurality of sensing modules configured to determine one or more parameters corresponding to each of the plurality of cells; and a control module configured to receive a charge request signal, and based on the charge request signal and the one or more parameters, (i) determine a number of groups of cells to connect in parallel to receive regenerative power, (ii) satisfy regenerative load requirements for the second source terminal before satisfying regenerative load requirements for the first source terminal, and (iii) utilize one or more groups of the plurality of cells with lowest states of charge for the first source terminal and charge other groups of the plurality of cells, wherein the other groups include the number of groups of cells and does not include the one or more groups.

16. A modular dynamically allocated capacity storage system (MODACS) comprising:

a housing comprising
a plurality of positive output source terminals supplying power at a first voltage potential to a first plurality of loads via a first source terminal and power at a second voltage potential to a second plurality of loads via a second source terminal,
a plurality of switches,
a plurality of cells configured to supply power to each of the plurality of positive output source terminals based on states of the plurality of switches, and
a plurality of sensing modules configured to determine one or more parameters corresponding to each of the plurality of cells; and a control module configured to receive a discharge request signal, and based on the discharge request signal and the one or more parameters, (i) determine a number of groups of cells to connect in parallel to discharge power, (ii) satisfy load requirements for the second source terminal before satisfying load requirements for the first source terminal, and (iii) utilize one or more groups of the plurality of cells with highest states of charge for the first source terminal and discharge other groups of the plurality of cells, wherein the other groups include the number of groups of cells and does not include the one or more groups.

17. A modular dynamically allocated capacity storage system (MODACS) comprising:

a housing comprising
a plurality of positive output source terminals supplying power at a first voltage potential to a first plurality of loads via a first source terminal and power at a second voltage potential to a second plurality of loads via a second source terminal,
a plurality of switches,
a plurality of cells each of which configured to supply power to each of the plurality of positive output source terminals based on states of the plurality of switches, and
a plurality of sensing modules configured to determine one or more parameters corresponding to each of the plurality of cells; and a control module configured to execute an algorithm to control capacity allocation for the plurality of positive output source terminals based on the parameters and at least one of: a vehicle operating state; states of power rails of the plurality of positive output source terminals; an amount of load current; a power rail hold-up time; an amount of power supplied to loads; rates of capacity changes for each of the plurality of positive output source terminals; priority levels of power domains; or minimum capacity requirements for one or more of the plurality of positive output source terminals, wherein the control module is configured to (i) determine which of the plurality of cells to connect to the first source terminal and which of the plurality of cells to connect to the second source terminal, and (ii) satisfy load requirements for the second source terminal before satisfying load requirements for the first source terminal.

18. The MODACS of claim 17, wherein the control module is configured to execute an algorithm to control capacity allocation for the plurality of positive output source terminals based on at least one of: the states of power rails of the plurality of positive output source terminals; the amount of load current; the power rail hold-up time; the amount of power supplied to loads; the rates of capacity changes for each of the plurality of positive output source terminals; the priority levels of power domains; and the minimum capacity requirements for one or more of the plurality of positive output source terminals.

19. A modular dynamically allocated capacity storage system (MODACS) comprising:
a housing comprising
a plurality of positive output source terminals including a first source terminal, a second source terminal and a third source terminal, wherein a preset voltage of the first source terminal is different than preset voltages of the second source terminal and the third source terminal,
a plurality of cells,
sets of switches, wherein each of the sets of switches includes at least four switches and connects one of the plurality of cells to the first source terminal, the second source terminal and the third source terminal; and
a control module is configured to
determine a connected configuration of the plurality of cells relative to the plurality of positive output source terminals including determining which ones of the plurality of cells to connect to each of the first source terminal, the second source terminal and the third source terminal, and
control states of the sets of switches according to the connected configuration, and
based on a plurality of parameters, (i) satisfy load requirements for the second source terminal before satisfying load requirements for the first source terminal, and (ii) selectively allocate first ones of the plurality of cells to supply power to the first source terminal and selectively allocate second ones of the plurality of cells to supply power to the second source terminal.

20. The MODACS of claim 19, wherein the plurality of parameters include two or more of: states of power rails of the plurality of positive output source terminals; an amount of load current; a power rail hold-up time; an amount of power supplied to loads; rates of capacity changes for each of the plurality of positive output source terminals; priority levels of power domains; and minimum capacity requirements for one or more of the plurality of positive output source terminals.

21. The MODACS of claim 19, wherein the control module is configured to execute an algorithm to control capacity allocation for the plurality of positive output source terminals based on a plurality of parameters of each of the plurality of cells.

* * * * *